(12) United States Patent
Kubono et al.

(10) Patent No.: US 8,699,950 B2
(45) Date of Patent: Apr. 15, 2014

(54) COMMUNICATION DEVICE AND METHOD, AND PROGRAM

(75) Inventors: Fumio Kubono, Tokyo (JP); Susumu Kusakabe, Tokyo (JP); Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/600,054

(22) Filed: Aug. 30, 2012

(65) Prior Publication Data

US 2013/0078919 A1 Mar. 28, 2013

Related U.S. Application Data

(63) Continuation of application No. 11/660,601, filed as application No. PCT/JP2006/009711 on May 16, 2006, now Pat. No. 8,280,302.

(30) Foreign Application Priority Data

May 17, 2005 (JP) .................................. 2005-144202

(51) Int. Cl.
*H04B 5/00* (2006.01)
(52) U.S. Cl.
USPC .......................................................... 455/41.1
(58) Field of Classification Search
CPC .................................................. H04B 5/0012
USPC ................ 455/41.1; 340/825.71, 870.37, 5.4, 340/5.52, 10.51, 552, 561, 539.1; 361/231; 726/22; 379/55.1; 381/77
See application file for complete search history.

(56) References Cited

U.S. PATENT DOCUMENTS

| | | | | |
|---|---|---|---|---|
| 5,914,701 A | * | 6/1999 | Gersheneld et al. | 345/156 |
| 6,104,913 A | * | 8/2000 | McAllister | 455/41.1 |
| 6,211,799 B1 | * | 4/2001 | Post et al. | 341/33 |
| 6,223,018 B1 | * | 4/2001 | Fukumoto et al. | 455/41.1 |
| 7,181,024 B1 | * | 2/2007 | Oba et al. | 381/77 |
| 7,443,290 B2 | * | 10/2008 | Takiguchi | 340/539.1 |
| 2006/0077616 A1 | * | 4/2006 | Takiguchi | 361/231 |

* cited by examiner

*Primary Examiner* — April G Gonzales
(74) *Attorney, Agent, or Firm* — Finnegan, Henderson, Farabow, Garrett & Dunner, L.L.P.

(57) ABSTRACT

The present invention relates to a device and a method for communication, and a program that make it possible to provide a communication environment not limited by a use environment. An electrode controlling unit in a transmitting device checks a state of capacitive coupling of each of an electrode and an electrode in an electrode unit with surroundings, controls connection of each electrode to a transmitting unit according to a result of the check, and makes the electrode and the electrode function as a transmission signal electrode or a transmission reference electrode, the transmission signal electrode and the transmission reference electrode being different from each other. The transmitting unit connects the electrode and the electrode to an amplifying unit under control of the electrode controlling unit, and transmits a signal to a communication medium via one of the electrodes. The present invention is applicable to communication systems.

13 Claims, 20 Drawing Sheets

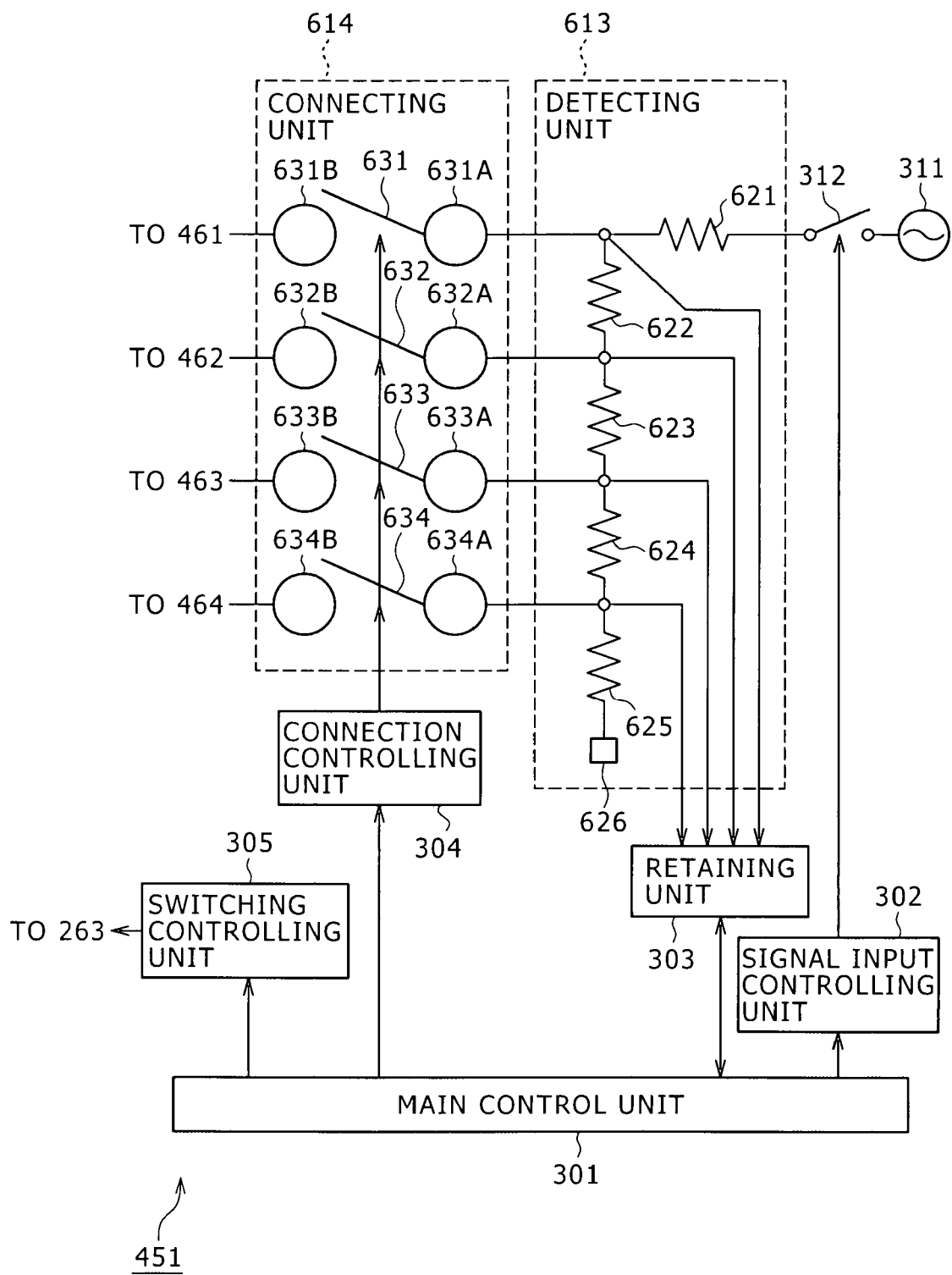

COMMUNICATION DEVICE AND METHOD, AND PROGRAM

CROSS-REFERENCE TO RELATED APPLICATIONS

This application is a continuation of U.S. application Ser. No. 11/660,601, filed Oct. 5, 2007 now U.S. Pat. No. 8,280, 302, now U.S. Publication No. 2008-0261523, which claims the benefit of PCT/JP2006/009711, filed May 16, 2006, which claims the benefit of JP Application No. 2005-144202, filed May 17, 2005, all of which are incorporated herein by reference in their entireties.

TECHNICAL FIELD

The present invention relates to a device and a method for communication, and a program, and particularly to a device and a method for communication, and a program that make communication possible in the communication device having at least two electrodes irrespective of physical positional relation between a user of the communication device and the communication device.

BACKGROUND ART

Conventionally, in a communication system including a transmitting device, a communication medium, and a receiving device, a physical communication signal transmitting path for transmitting a communication signal and a physical reference point path different from the communication signal transmitting path, the reference point path being to share a reference point for determining a difference in level of the communication signal between the transmitting device and the receiving device, are provided to perform communication (see for example Patent Document 1 or Patent Document 2).

For example, Patent Document 1 and Patent Document 2 describe communication techniques using a human body as a communication medium. In both methods, a human body is used as a first communication path, and direct capacitive coupling between electrodes in a ground or a space is provided as a second communication path, so that an entire communication path formed by the first communication path and the second communication path forms a closed circuit.

[Patent Document 1]
Japanese Patent Laid-Open No. Hei 10-229357
[Patent Document 2]
JP-A-Hei 11-509380

DISCLOSURE OF THE INVENTION

Problems to be Solved by the Invention

However, in such a communication system, two communication paths, that is, the communication signal transmitting path and the reference point path (the first communication path and the second communication path) need to be provided as a closed circuit between the transmitting device and the receiving device. Since the two paths are different paths, making the two paths stably coexist with each other may limit a use environment for communication.

For example, the strength of capacitive coupling between the transmitting device and the receiving device in the reference point path depends on a distance between the devices, and therefore the stability of the path differs depending on the distance. That is, in this case, there is a fear of the stability of communication depending on the distance of the reference point path between the transmitting device and the receiving device. In addition, there is a fear of the stability of communication being changed by the presence of a shielding object or the like between the transmitting device and the receiving device. Further, for example, when a ground is set as a reference point, and the transmitting device and the receiving device are capacitively coupled with each other via the ground (when the reference point path includes the ground), the reference point path is changed according to positional relation between the ground, the transmitting device, the receiving device, and the communication medium for example a human body), and thus there is a fear of the stability of communication being varied.

As described above, in the communication methods that form the two paths, that is, the communication signal transmitting path and the reference point path as a closed circuit, the use environment greatly affects the stability of communication, and it is therefore difficult to perform stable communication.

Further, for example, when such a transmitting device and such a receiving device are applied to mobile devices, and the mobile devices perform communication via a human body, a manner of for example holding or wearing the casing of the transmitting device or the receiving device may differ depending on the user. That is, it is desirable to enable communication in any state as long as the transmitting device and the receiving device are in proximity to the human body however, in the communication methods that form the two paths, that is, the communication signal transmitting path and the reference point path as a closed circuit as described above, it is difficult to secure each of the two paths unless positional relation between the communicating devices (the transmitting device and the receiving device) and the communication medium is defined.

Conventionally, there is a technique in which the function of each of two electrodes included in a communicating device is fixed in order to secure the two paths. For example, there is a contact type human body communicating device including a wristwatch type ID retaining unit and a reading unit for reading the ID retaining unit. In the human body communicating device, wearing positional relation between the two electrodes attached to the wristwatch type ID retaining unit and a human body is fixed.

However, such a communicating device requires positional relation between a user and the device to be in accordance with a specific rule, thus limiting the use environment.

The present invention has been made in view of such a situation, and it is an object of the present invention to impose no limitations on positional relation between a user and a communicating device, stabilize communication, and provide a high degree of convenience by dynamically controlling the functions of electrodes.

Means for Solving the Problems

A communicating device according to the present invention includes: communication processing means for performing communication processing; connecting means for connecting the communication processing means to a plurality of electrodes; and connection controlling means for controlling the connecting means to connect a first electrode of the plurality of electrodes, the first electrode being capacitively coupled with a communication medium, to a first terminal of the communication processing means, and connect a second electrode capacitively coupled with a space more strongly than the first electrode to a second terminal of the communication processing means.

The connection controlling means can include: signal level detecting means for detecting a signal level of a signal for checking a state of capacitive coupling of each of the plurality of electrodes with surroundings when the signal is supplied to each electrode; and controlling means for controlling connection of the plurality of electrodes to the communication processing means on a basis of the signal level detected by the signal level detecting means.

The connection controlling means further includes electrode selecting means for selecting an electrode to which to supply the signal, and the signal level detecting means can detect the signal level of the signal when the signal is supplied to the electrode selected by the electrode selecting means.

The connection controlling means further includes retaining means for retaining the signal level detected by the signal level detecting means for each electrode, and the controlling means can control the connection of the plurality of electrodes to the communication processing means on the basis of the signal level of each electrode, the signal level being retained by the retaining means.

The connection controlling means can simultaneously supply the signal to all the electrodes, and the signal level detecting means can simultaneously detect the signal level corresponding to each of all the electrodes.

The connection controlling means further includes a plurality of loads connected to each of the plurality of electrodes and connected in series with each other, and the signal level detecting means can detect signal levels occurring at the plurality of loads connected in series with each other.

The connection controlling means can control the connecting means after stopping the communication processing by the communication processing means.

The connection controlling means can control the connecting means in a free time of the communication processing by the communication processing means.

The connection controlling means can control the connecting means in a manner continuous with the communication processing by the communication processing means.

The connection controlling means can control the connecting means simultaneously with a transmission process by the communication processing means, using a transmission signal in the transmission process.

The communication processing means has a transmitting output terminal and a receiving input terminal, and the connection controlling means can control the connecting means to connect the first electrode to the transmitting output terminal or the receiving input terminal of the communication processing means.

A communicating method according to the present invention includes: a communication controlling step of controlling a communication processing unit for performing communication processing; and a connection controlling step of controlling a connecting unit for connecting the communication processing unit for performing the communication processing under control of the communication controlling step to a plurality of electrodes to connect a first electrode of the plurality of electrodes, the first electrode being capacitively coupled with a communication medium, to a first terminal of the communication processing unit, and connect a second electrode capacitively coupled with a space more strongly than the first electrode to a second terminal of the communication processing unit.

A program according to the present invention includes: a communication controlling step of controlling a communication processing unit for performing communication processing; and a connection controlling step of controlling a connecting unit for connecting the communication processing unit for performing the communication processing under control of the communication controlling step to a plurality of electrodes to connect a first electrode of the plurality of electrodes, the first electrode being capacitively coupled with a communication medium, to a first terminal of the communication processing unit, and connect a second electrode capacitively coupled with a space more strongly than the first electrode to a second terminal of the communication processing unit.

The communicating device and method and the program according to the present invention control a communication processing unit to perform communication processing, and control a connecting unit for connecting the communication processing unit to a plurality of electrodes to connect a first electrode of the plurality of electrodes, the first electrode being capacitively coupled with a communication medium, to a first terminal of the communication processing unit, and connect a second electrode capacitively coupled with a space more strongly than the first electrode to a second terminal of the communication processing unit.

Effect of the Invention

According to the present invention, communication is made possible irrespective of physical positional relation between a user of a communicating device and the communicating device.

BRIEF DESCRIPTION OF THE DRAWINGS

FIG. 19 is a block diagram showing another example of detailed configuration of an electrode controlling unit in FIG. 15.

Figure 1:
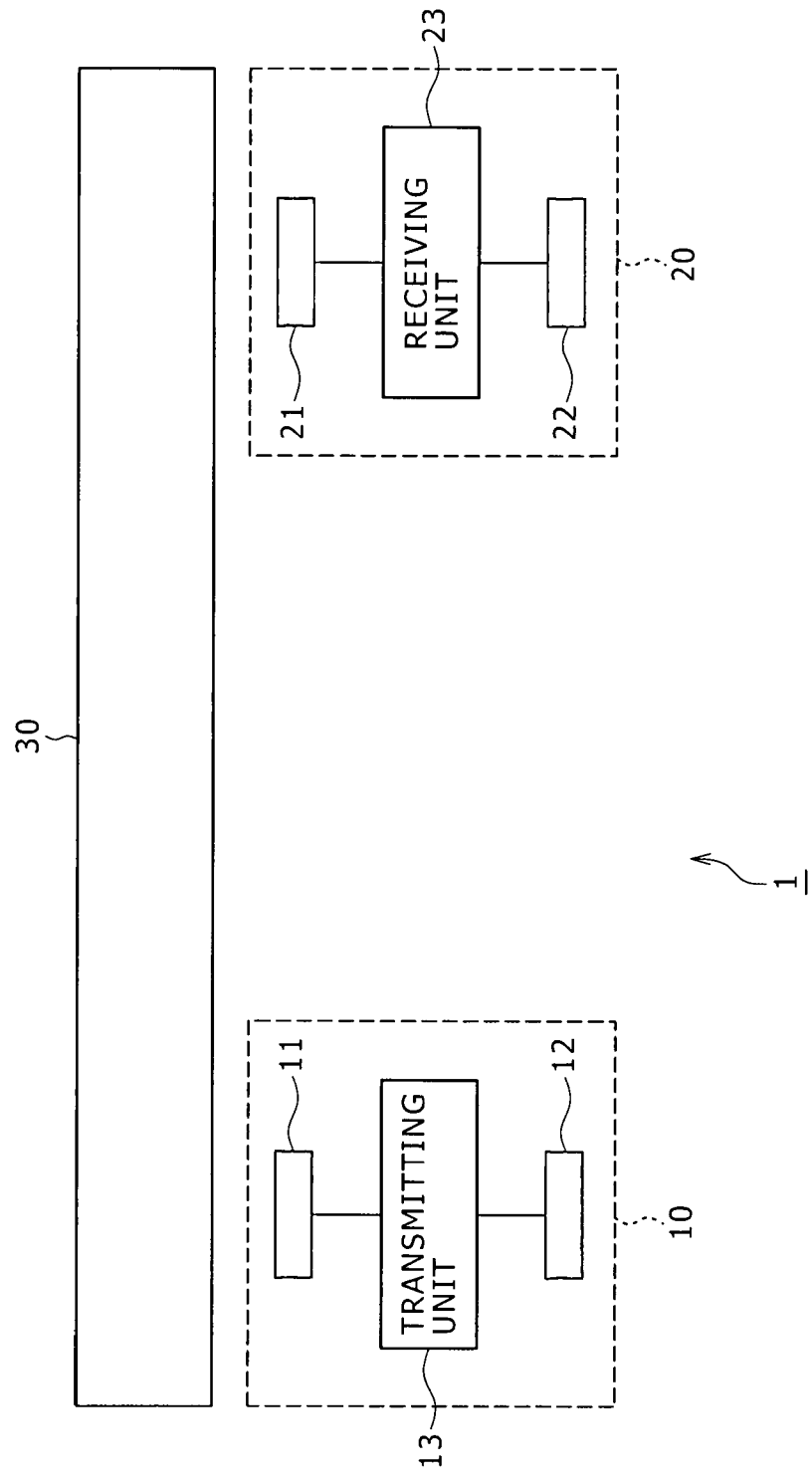
FIG. 1 is a diagram showing an example of a configuration according to an embodiment of a communication system to which the present invention is applied.

DESCRIPTION OF REFERENCE NUMERALS 1 communication system, 10 transmitting device, 11 transmission signal electrode, 12 transmission reference electrode, 13 transmitting unit, 20 receiving device, 21 received signal electrode, 22 reception reference electrode, 23 receiving unit, 30 communication medium, 63-1 signal source, 63-2 reference point within the transmitting device, 64 Cte, 65 Ctg, 66 reference point, 73-1 Rr, 73-2 detector, 73-3 reference point within the receiving device, 74 Cre, 75 Crg, 76 reference point, 117-1 Ctb, 117-2 Cth, 117-3 Cti, 127-1 Crb, 127-2 Crh, 127-3 Cri, 131 Rm, 132 Cm, 133 Rm, 136 reference point, 180 human body, 200 casing, 211 to 216 electrode, 220 hand, 260 transmitting device, 261 electrode controlling unit, 262 electrode unit, 263 transmitting unit, 301 main control unit, 302 signal input controlling unit, 303 retaining unit, 304 connection controlling unit, 305 switching controlling unit, 311 signal source, 312 switch, 313 detecting unit, 314 connecting unit, 351 transmission controlling unit, 352 transmission signal generating unit, 353 amplifying unit, 354 connecting unit, 355 connection controlling unit, 370 receiving device, 371 electrode controlling unit, 372 electrode unit, 373 receiving unit, 401 reception controlling unit, 450 communicating device, 451 electrode controlling unit, 452 electrode unit, 453 communicating unit, 501 communication controlling unit, 613 detecting unit, 614 connecting unit

BEST MODE FOR CARRYING OUT THE INVENTION

Embodiments of the present invention will hereinafter be described with reference to the drawings. Description will first be made of principles of communication by a communication system.

FIG. 1 is a diagram showing an example of a configuration according to an embodiment of a communication system to which the present invention is applied.

The communication system 1 in FIG. 1 includes a transmitting device 10, a receiving device 20, and a communication medium 30. In the communication system 1, the transmitting device 10 and the receiving device 20 transmit and receive a signal via the communication medium 30. That is, in the communication system 1, a signal transmitted by the transmitting device 10 is transmitted via the communication medium 30, and then received by the receiving device 20.

The transmitting device 10 has a transmission signal electrode 11, a transmission reference electrode 12, and a transmitting unit 13. The transmission signal electrode 11 is one electrode of the electrode pair provided to transmit a signal to be transmitted via the communication medium 30. The transmission signal electrode 11 is provided in such a manner as to be capacitively coupled to the communication medium 30 more strongly than the transmission reference electrode 12 as another electrode of the electrode pair. The transmitting unit 13 is provided between the transmission signal electrode 11 and the transmission reference electrode 12, The transmitting unit 13 gives an electric signal (potential difference) desired to be transmitted to the receiving device 20 between these electrodes.

The receiving device 20 has a received signal electrode 21, a reception reference electrode 22, and a receiving unit 23. The received signal electrode 21 is one electrode of the electrode pair provided to receive the signal transmitted via the communication medium 30. The received signal electrode 21 is provided in such a manner as to be capacitively coupled to the communication medium 30 more strongly than the reception reference electrode 22 as another electrode of the electrode pair. The receiving unit 23 is provided between the received signal electrode 21 and the reception reference electrode 22. The receiving unit 23 detects an electric signal (potential difference) generated between these electrodes by the signal transmitted via the communication medium 30, converts the electric signal into a desired electric signal, and thereby reconstructs the electric signal generated by the transmitting unit 13 in the transmitting device 10.

The communication medium 30 is formed by a material having a physical characteristic that allows the electric signal to be transmitted, for example, an electric conductor, a dielectric or the like. For example, the communication medium 30 is formed by a conductor typified by a metal such as copper, iron, aluminum or the like, a dielectric typified by pure water, rubber, glass or the like, or a material having both properties of a conductor and properties of a dielectric, such for example as a living body or the like as a complex of the conductor and the dielectric or an electrolytic solution such as a saline solution or the like, In addition, the communication medium 30 may have any shape. For example, the communication medium 30 may be of the shape of a line, of the shape of a plate, of the shape of a sphere, a prism, a circular cylinder or the like, or may further be of any arbitrary shape other than these shapes.

Description will first be made of relation between each electrode and the communication medium or a space surrounding the devices in such a communication system 1. Incidentally, suppose in the following that the communication medium 30 is a perfect conductor for convenience of description. In addition, suppose that there is a space between the transmission signal electrode 11 and the communication medium 30 and there is a space between the received signal electrode 21 and the communication medium 30, and that there is no electric coupling between the transmission signal electrode 11 and the communication medium 30 and there is no electric coupling between the received signal electrode 21 and the communication medium 30. That is, a capacitance is formed between the transmission signal electrode 11 or the received signal electrode 21 and the communication medium 30.

The transmission reference electrode 12 is disposed so as to face a space around the transmitting device 10. The reception reference electrode 22 is disposed so as to face a space around the receiving device 20. Generally, when a conductor sphere is present in a space, a capacitance is formed between the conductor sphere and the space. For example, when the shape of the conductor is a sphere with a radius r [m], the capacitance C is obtained by the following Equation (1).

[Equation 1]

$$C = 4\pi \in r \, [F] \qquad (1)$$

In Equation (1), π denotes a ratio of the circumference of a circle to its diameter, and ∈ denotes a dielectric constant, which is obtained by the following Equation (2).

[Equation 2]

$$\in = \in_r \times \in_0 \quad (2)$$

In Equation (2), $\in_0$ to denotes a dielectric constant in a vacuum and is $8.854 \times 10^{-12}$ [F/m], and $\in_r$ denotes a relative dielectric constant, which represents a ratio to the dielectric constant $\in_0$ in the vacuum.

As shown in the above Equation (1), the larger the radius r, the larger the capacitance C. Incidentally, the magnitude of the capacitance C of a conductor having a complex shape other than a sphere cannot be expressed simply as in the above Equation (1). It is obvious, however, that the magnitude of the capacitance C of the conductor changes according to the magnitude of the surface area of the conductor.

As described above, the transmission reference electrode 12 forms a capacitance with the space surrounding the transmitting device 10, and the reception reference electrode 22 forms a capacitance with the space surrounding the receiving device 20. That is, it is shown that as viewed from a virtual point at infinity outside the transmitting device 10 and the receiving device 20, the potentials of the transmission reference electrode 12 and the reception reference electrode 22 increase resistance thereof to variation as the capacitances are increased.

Incidentally, though for convenience of description or in a context or the like, a capacitor may herein be expressed simply as a capacitance, the capacitor and the capacitance have the same meaning. In addition, suppose that the transmitting device 10 and the receiving device in FIG. 1 are arranged such that a sufficient distance is maintained between the devices, and that therefore effects of the transmitting device 10 and the receiving device 20 on each other can be ignored. Further, suppose that the transmission signal electrode 11 in the transmitting device 10 is capacitively coupled with only the communication medium 30, and that the transmission reference electrode 12 is located at a sufficient distance from the transmission signal electrode 11, so that effects of the transmission reference electrode 12 and the transmission signal electrode 11 on each other can be ignored (the transmission reference electrode 12 and the transmission signal electrode 11 are not capacitively coupled with each other). Similarly, suppose that the received signal electrode 21 in the receiving device 20 is capacitively coupled with only the communication medium 30, and that the reception reference electrode 22 is located at a sufficient distance from the received signal electrode 21, so that effects of the reception reference electrode 22 and the received signal electrode 21 on each other can be ignored (the reception reference electrode 22 and the received signal electrode 21 are not capacitively coupled with each other). Further, in practice, the transmission signal electrode 11, the received signal electrode 21, and the communication medium 30 are disposed within a space, and therefore the transmission signal electrode 11, the received signal electrode 21, and the communication medium 30 each have a capacitance in relation to the space. For convenience of description, however, suppose that these capacitances can be ignored.

Figure 2:
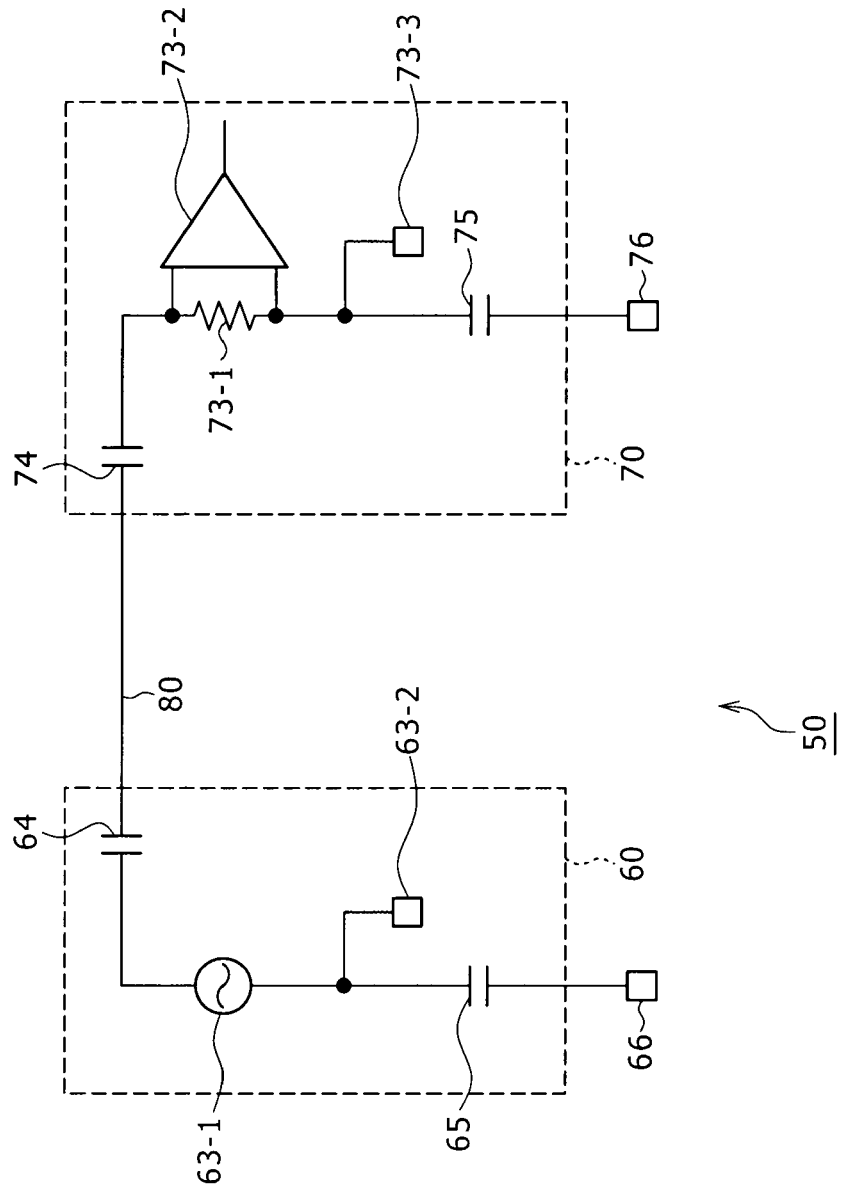
FIG. 2 is a diagram showing an example of an equivalent circuit of the communication system of FIG. 1.

FIG. 2 is a diagram in which the communication system 1 of FIG. 1 is represented by an equivalent circuit. That is, a communication system 50 shown in FIG. 2 is equivalent in effect to the communication system 1.

Specifically, the communication system 50 has a transmitting device 60, a receiving device 70, and a connection line 80. The transmitting device 60 corresponds to the transmitting device 10 in the communication system 1 shown in FIG. 1. The receiving device 70 corresponds to the receiving device 20 in the communication system 1 shown in FIG. 1. The connection line 80 corresponds to the communication medium 30 in the communication system 1 shown in FIG. 1.

In the transmitting device 60 in FIG. 2, a signal source 63-1 and a reference point 63-2 within the transmitting device correspond to the transmitting unit 13 in FIG. 1. The signal source 63-1 generates, as a signal for transmission, a sine wave having a specific period ω×t (rad), where t [s] denotes time, and ω [rad/s] denotes an angular frequency, which can be expressed by the following Equation (3).

[Equation 3]

$$\omega = 2\pi f \, [rad/s] \quad (3)$$

In Equation (3), π denotes a ratio of the circumference of a circle to its diameter, and f [Hz] denotes the frequency of the signal generated by the signal source 63-1. The reference point 63-2 within the transmitting device is a point connected to a ground of a circuit within the transmitting device 60. That is, one of terminals of the signal source 63-1 is set to a predetermined reference potential of the circuit within the transmitting device 60.

Cte 64 is a capacitor, and represents a capacitance between the transmission signal electrode 11 and the communication medium 30 in FIG. 1. That is, Cte 64 is provided between the connection line 80 and the terminal of the signal source 63-1 which terminal is on an opposite side from the reference point 63-2 within the transmitting device. Ctg 65 is a capacitor, and represents a capacitance of the transmission reference electrode 12 in FIG. 1 in relation to the space. Ctg 65 is disposed between the terminal of the signal source 63-1 which terminal is on the side of the reference point 63-2 within the transmitting device and a reference point 66 representing a point at infinity (virtual point) on the space with the transmitting device 60 as a reference.

In the receiving device 70 in FIG. 2, Rr 73-1, a detector 73-2, and a reference point 73-3 within the receiving device correspond to the receiving unit 23 in FIG. 1. Rr 73-1 is a load resistance (reception load) for extracting a received signal. The detector 73-2 formed by an amplifier detects a potential difference across Rr 73-1, and amplifies the potential difference. The reference point 73-3 within the receiving device is a point connected to a ground of a circuit within the receiving device 70. That is, one of terminals of Rr 73-1 (one of input terminals of the detector 73-2) is set to a predetermined reference potential of the circuit within the receiving device 70.

Incidentally, the detector 73-2 may have other functions of for example demodulating a detected modulated signal and decoding encoded information included in the detected signal.

Cre 74 is a capacitor, and represents a capacitance between the received signal electrode 21 and the communication medium 30 in FIG. 1. That is, Cre 74 is provided between the connection line 80 and the terminal of Pr 73-1 which terminal is on an opposite side from the reference point 73-3 within the receiving device. Crg 75 is a capacitor, and represents a capacitance of the reception reference electrode 22 in FIG. 1 in relation to the space. Crg 75 is disposed between the terminal of Rr 73-1 which terminal is on the side of the reference point 73-3 within the receiving device and a reference point 76 representing a point at infinity (virtual point) on the space with the receiving device 20 as a reference.

The connection line 80 represents the communication medium 30 as a perfect conductor. Incidentally, in the communication system 50 in FIG. 2, Ctg 65 and Crg 75 are expressed as electrically connected to each other via the reference point 66 and the reference point 76 on the equivalent circuit. In practice, however, these capacitors do not need to be electrically connected to each other, and it suffices for each of the capacitors to form a capacitance in relation to the space surrounding the transmitting device 60 or the receiving device 70. It is important to know that when there is a conductor, a capacitance proportional to the magnitude of the surface area of the conductor is always formed between the conductor and a surrounding space. Incidentally, the reference point 66 and the reference point 76 do not need to be electrically connected to each other, and may have potentials independent of each other.

When the communication medium 30 in FIG. 1 is a perfect conductor, for example, the conductivity of the connection line 80 is infinite. Therefore the length of the connection line 80 in FIG. 2 does not affect communication, incidentally, when the communication medium 30 is a conductor having a sufficient conductivity, a distance between the transmitting device and the receiving device does not affect the stability of communication practically. Thus, in such a case, the distance between the transmitting device 60 and the receiving device 70 may be any length.

In the communication system 50, a circuit formed of the signal source 63-1, Rr 73-1, Cte 64, Ctg 65, Cre 74, and Crg 75 is formed. A combined capacitance $C_x$ of the four capacitors (Cte 64, Ctg 65, the Cre capacitor 74, and Crg 75) connected in series with each other can be expressed by the following Equation (4).

[Equation 4]

$$C_x = \frac{1}{\frac{1}{Cte} + \frac{1}{Ctg} + \frac{1}{Cre} + \frac{1}{Crg}} \ [F] \quad (4)$$

A sine wave $v_t(t)$ generated by the signal source 63-1 is expressed by the following Equation (5).

[Equation 5]

$$V_t(t) = V_m \times \sin(\omega t + \theta) \ [V] \quad (5)$$

Where $V_m$ [V] denotes a maximum amplitude voltage of a signal source voltage, and $\theta$ [rad] denotes an initial phase angle. An effective value $V_{trms}$ [V] of the voltage generated by the signal source 63-1 can be obtained by the following Equation (6).

[Equation 6]

$$V_{trms} = \frac{V_m}{\sqrt{2}} \ [V] \quad (6)$$

A combined impedance Z of the whole circuit can be obtained by the following Equation (7).

[Equation 7]

$$Z = \sqrt{Rr^2 + \frac{1}{(\omega C_x)^2}} \quad (7)$$

$$= \sqrt{Rr^2 + \frac{1}{(2\pi f C_x)^2}} \ [\Omega]$$

Thus, an effective value $v_{rrms}$ [V] of a voltage across Rr 73-1 can be obtained by the following Equation (8).

[Equation 8]

$$V_{rrms} = \frac{Rr}{Z} \times V_{rrms} \quad (8)$$

$$= \frac{Rr}{\sqrt{Rr^2 + \frac{1}{(2\pi f C_x)^2}}} \times V_{rrms} \ [V]$$

Hence, as shown in Equation (8), as the resistance value of Rr 73-1 is increased, and as the term $1/((2\times\pi f\times C_x)^2)$ is reduced with increase in the capacitance $C_x$ and increase in frequency f [Hz] of the signal source 63-1, a signal having a greater magnitude can be generated across Rr 73-1.

For example, results of calculation of the effective value $V_{rrms}$ [V] of the voltage across Rr 73-1 when the effective value $V_{trms}$ [V] of the voltage generated by the signal source 63-1 in the transmitting device 60 is fixed at 2 [V], the frequency f of the signal generated by the signal source 63-1 is set at 1 [MHz], 10 [MHz], or 100 [MHz], the resistance value of Rr 73-1 is set at 10 [KΩ], 100 [KΩ], or 1 [MΩ], and the capacitance $C_x$ of the whole circuit is set at 0.1 [pF], 1 [pF], or 10 [pF] show that other conditions being equal, the effective value $V_{rrms}$ is higher when the frequency f is 10 [MHz] than when the frequency f is 1 [MHz], is higher when the resistance value of Rr 73-1 as reception load is 1 [MΩ] than when the resistance value of Rr 73-1 is 10 [KΩ], and is higher when the capacitance $C_x$ is 10 [pF] than when the capacitance $C_x$ is 0.1 [pF]. That is, as the value of the frequency f, the resistance value of Rr 73-1, and the capacitance $C_x$ are increased, the effective value $V_{rrms}$ of higher voltage is obtained.

Incidentally, when a transmitted signal has a very low signal level, communication is made possible by for example amplifying the signal detected by the detector 73-2 in the receiving device 60.

Figure 3:
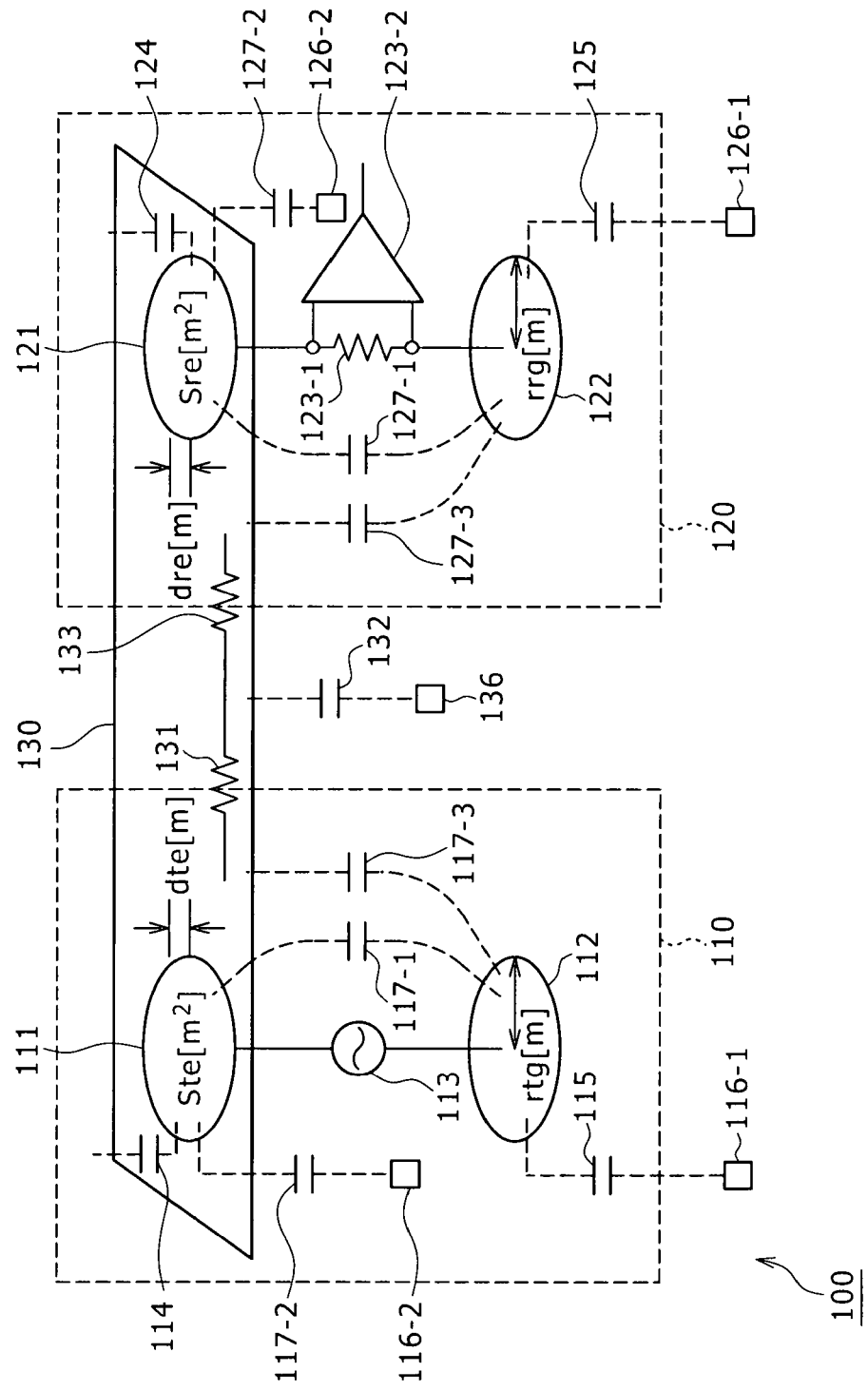
FIG. 3 is a diagram showing an example of a model for a physical configuration of the communication system of FIG. 1.

Description will next be made of a case where the present communication system is physically formed in practice. FIG. 3 is a diagram showing an example of a model for computing parameters occurring on the system when the above-described communication system is physically formed in practice.

That is, a communication system 100 has a transmitting device 110, a receiving device 120, and a communication medium 130. The communication system 100 corresponds to the above-described communication system 1 (communication system 50). Only parameters to be evaluated are different, and the communication system 100 has basically the same configuration as the communication system 1 and the communication system 50.

That is, making description by comparison with the communication system 1 of FIG. 1, the transmitting device 110 corresponds to the transmitting device 10, the receiving device 120 corresponds to the receiving device 20, and the communication medium 130 corresponds to the communication medium 30.

The transmitting device 110 has a transmission signal electrode 111 corresponding to the transmission signal electrode 11, a transmission reference electrode 112 corresponding to the transmission reference electrode 12, and a signal source 113 corresponding to the transmitting unit 13. That is, the transmission signal electrode 111 is connected to one of terminals on both sides of the signal source 113, and the transmission reference electrode 112 is connected to the other terminal. The transmission signal electrode 111 is disposed in proximity to the communication medium 130. The transmission reference electrode 112 is formed in such a manner as to have a capacitance in relation to a space external to the transmitting device 110. Incidentally, while the signal source 63-1 and the reference point 63-2 within the transmitting device in FIG. 2 correspond to the transmitting unit 13, the reference point within the transmitting device is omitted in FIG. 3 for convenience of description.

As with the transmitting device 110, the receiving device 120 has a received signal electrode 121 corresponding to the received signal electrode 21, a reception reference electrode 122 corresponding to the reception reference electrode 22, and Rr 123-1 and a detector 123-2 corresponding to the receiving unit 23. That is, the received signal electrode 121 is connected to one of terminals on both sides of Rr 123-1, and the reception reference electrode 122 is connected to the other terminal. The received signal electrode 121 is disposed in proximity to the communication medium 130. The reception reference electrode 122 is formed in such a manner as to have a capacitance in relation to a space external to the receiving device 120. Incidentally, while Rr 73-1, the detector 73-2, and the reference point 73-3 within the receiving device in FIG. 2 correspond to the receiving unit 23, the reference point within the receiving device is omitted in FIG. 3 for convenience of description.

Incidentally, suppose that the communication medium 130 is a perfect conductor as in the cases of FIG. 1 and FIG. 2. Suppose that the transmitting device 110 and the receiving device 120 are arranged at a sufficient distance from each other, and that effects of the transmitting device 110 and the receiving device 120 on each other can be ignored.

Description will be made of the parameters. A capacitance Cte 114 between the transmission signal electrode 111 and the communication medium 130 corresponds to Cte 64 in FIG. 2. A capacitance of the transmission reference electrode 112 in relation to the space (a capacitance between the transmission reference electrode 112 and a reference point 116-1 representing a virtual point at infinity from the transmission reference electrode 112 on the space) Ctg 115 corresponds to Ctg 65 in FIG. 2. The reference point 116-1 and a reference point 116-2 representing a virtual point at infinity from the transmitting device 110 on the space correspond to the reference point 66 in FIG. 2. The transmission signal electrode 111 is a disk-shaped electrode having an area Ste [m²], and is located at a minute distance dte [m] from the communication medium 130. The transmission reference electrode 112 is also a disk-shaped electrode, and has a radius rtg [m].

On the receiving device 120 side, a capacitance Cre 124 between the received signal electrode 121 and the communication medium 130 corresponds to Cre 74 in FIG. 2. A capacitance of the reception reference electrode 122 in relation to the space (a capacitance between the reception reference electrode 122 and a reference point 126-1 representing a virtual point at infinity from the reception reference electrode 122 on the space) Crg 125 corresponds to Crg 75 in FIG. 2. The reference point 126-1 and a reference point 126-2 representing a virtual point at infinity from the receiving device 120 on the space correspond to the reference point 76 in FIG. 2. The received signal electrode 121 is a disk-shaped electrode having an area Sre [m²], and is located at a minute distance dre [m] from the communication medium 130. The reception reference electrode 122 is also a disk-shaped electrode, and has a radius rrg [m].

Further, new parameters are added to the communication system 100 of FIG. 3 as follows.

For example, added to the transmitting device 110 as new parameters are a capacitance Ctb 117-1 formed between the transmission signal electrode 111 and the transmission reference electrode 112, a capacitance Cth 117-2 formed between the transmission signal electrode 111 and the space (a capacitance between the transmission signal electrode 111 and a reference point 116-2 representing a virtual point at infinity from the transmission signal electrode 111 on the space), and a capacitance Cti 117-3 formed between the transmission reference electrode 112 and the communication medium 130.

Added to the receiving device 120 as new parameters are a capacitance Crb 127-1 formed between the received signal electrode 121 and the reception reference electrode 122, a capacitance Crh 127-2 formed between the received signal electrode 121 and the space (a capacitance between the received signal electrode 121 and a reference point 126-2 representing a virtual point at infinity from the received signal electrode 121 on the space), and a capacitance Cri 127-3 formed between the reception reference electrode 122 and the communication medium 130.

Further, a capacitance Cm 132 formed between the communication medium 130 and the space (a capacitance between the communication medium 130 and a reference point 136 representing a virtual point at infinity from the communication medium 130 on the space) is added to the communication medium 130 as a new parameter. In addition, since the communication medium 130 in practice has an electric resistance depending on the size, material and the like of the communication medium 130, resistance values Rm 131 and Rm 133 as resistance components of the communication medium 130 are added as new parameters.

Incidentally, though omitted in the communication system 100 of FIG. 3, when the communication medium has not only conductivity but also dielectric properties, a capacitance according to the dielectric properties is also formed. When the communication medium does not have conductivity but has dielectric properties, coupling between the transmission signal electrode 111 and the received signal electrode 121 is provided by a capacitance determined by the dielectric constant, distance, size, and disposition of the dielectric.

In this case, it is assumed that the transmitting device 110 and the receiving device 120 are separated from each other at a distance such that an element of capacitive coupling can be ignored (effects of capacitive coupling between the transmitting device 110 and the receiving device 120 can be ignored). If the distance is short, depending on positional relation between each electrode within the transmitting device 110 and each electrode within the receiving device 120, capacitances between the electrodes may need to be considered according to the above-described way of thinking.

The communication system 100 having such parameters has characteristics as follows.

For example, the higher the value of Cte 114 (the higher the capacitance), the greater the magnitude of the signal applied by the transmitting device 110 to the communication medium 130. In addition, the higher the value of Ctg 115 (the higher the capacitance), the greater the magnitude of the signal applied by the transmitting device 110 to the communication medium 130. Further, the lower the value of Ctb 117-1 (the lower the capacitance), the greater the magnitude of the signal applied by the transmitting device 110 to the communication medium 130. In addition, the lower the value of Cth 117-2 (the lower the capacitance), the greater the magnitude of the signal applied by the transmitting device 110 to the communication medium 130. Further, the lower the value of Cti 117-3 (the lower the capacitance), the greater the magnitude of the signal applied by the transmitting device 110 to the communication medium 130.

The higher the value of Cre 124 (the higher the capacitance), the greater the magnitude of the signal extracted from the communication medium 130 by the receiving device 120. In addition, the higher the value of Crg 125 (the higher the capacitance), the greater the magnitude of the signal extracted from the communication medium 130 by the receiving device 120. Further, the lower the value of Crb 127-1 (the lower the capacitance), the greater the magnitude of the signal extracted from the communication medium 130 by the receiving device 120. In addition, the lower the value of Crh 127-2 (the lower the capacitance), the greater the magnitude of the signal extracted from the communication medium 130 by the receiving device 120. Further, the lower the value of Cri 127-3 (the lower the capacitance), the greater the magnitude of the signal extracted from the communication medium 130 by the receiving device 120. In addition, the lower the value of Rr 123-1 (the higher the resistance), the greater the magnitude of the signal extracted from the communication medium 130 by the receiving device 120.

The lower the values of Rm 131 and Rm 133 as resistance components of the communication medium 130 (the lower the resistances), the greater the magnitude of the signal applied by the transmitting device 110 to the communication medium 130. In addition, the lower the value of Cm 132 as the capacitance of the communication medium 130 in relation to the space (the lower the capacitance), the greater the magnitude of the signal applied by the transmitting device 110 to the communication medium 130.

The magnitude of capacitance of a capacitor is substantially proportional to the magnitude of the surface area of the electrode. Therefore it is generally desirable to increase the size of each electrode as much as possible. However, simply increasing the size of electrodes may also increase capacitances between the electrodes. In addition, an extreme ratio between the sizes of electrodes may decrease efficiency. It is thus necessary to determine the size, arrangement position and the like of each electrode in consideration of a total balance.

Incidentally, with the characteristics of the above-described communication system 100, efficient communication is made possible by viewing the present equivalent circuit from a viewpoint of impedance matching and determining each parameter in a frequency band of high frequencies of the signal source 113. By raising the frequency, it is possible to secure a reactance even with a low capacitance, so that each device can be miniaturized easily.

The reactance of a capacitor is generally increased with decrease in frequency. On the other hand, the communication system 100 operates based on capacitance coupling, and therefore this determines a lower limit of the frequency of the signal generated by the signal source 113. In addition, an arrangement of Rm 131, Cm 132, and Rm 133 forms a low-pass filter, and therefore characteristics thereof determine an upper limit of the frequency.

A specific numerical value of each parameter will next be considered. Incidentally, suppose in the following that the communication system 100 is placed in the air for convenience of description. In addition, suppose that the transmission signal electrode 111, the transmission reference electrode 112, the received signal electrode 121, and the reception reference electrode 122 of the communication system 100 are each a conductor disk having a diameter of 5 cm.

Supposing that the interval dte between the transmission signal electrode 111 and the communication medium 130 is 5 mm, the value of the capacitance Cte 114 formed by the transmission signal electrode 111 and the communication medium 130 is obtained by the following Equation (9).

[Equation 9]

$$Cte = \varepsilon \times \frac{Ste}{dte} \qquad (9)$$
$$= \frac{(8.854 \times 10^{-12}) \times (2 \times 10^{-3})}{5 \times 10^{-3}}$$
$$\approx 3.5 \ [pF]$$

Assume that Equation (9) can be adapted to Ctb 117-1 as the capacitance between the electrodes. While the equation essentially holds when the area of the electrodes is sufficiently large as compared with the interval as described above, an approximation may be made by this equation in this case. Supposing that the interval between the electrodes is 5 cm, Ctb 117-1 is expressed by the following Equation (10).

[Equation 10]

$$Ctb = \varepsilon \times \frac{Ste}{d} \qquad (10)$$
$$= \frac{(8.854 \times 10^{-12}) \times (2 \times 10^{-3})}{5 \times 10^{-2}}$$
$$\approx 0.35 \ [pF]$$

An assumption is made in this case that when the interval between the transmission signal electrode 111 and the communication medium 130 is short, the transmission signal electrode 111 is weakly coupled with the space. Therefore suppose that the value of Cth 117-2 is sufficiently lower than the value of Cte 114, and that the value of Cth 117-2 can be set to one tenth of the value of Cte 114 as expressed by Equation (11).

[Equation 11]

$$Cth = \frac{Cte}{10} = 0.35 \ [pF] \qquad (11)$$

Ctg 115 indicating the capacitance formed by the transmission reference electrode 112 and the space can be obtained by the following Equation (12).

[Equation 12]

$$Ctg = 8 \times 8.854 \times 10^{-12} \times 2.5 \times 10^{-2} \approx 1.8 [pF] \qquad (12)$$

Since the transmission signal electrode 111 and the communication medium 130 are situated at substantially the same position, the value of Cti 117-3 is considered to be equal to Ctb 117-1 as follows.

$$Cti = Ctb = 0.35 \, [\text{pF}]$$

When the formation (size, placement position and the like) of each electrode in the receiving device 120 is the same as in the transmitting device 110, the parameters of the receiving device 120 are set in the same manner as the parameters of the transmitting device 110 as follows.

$$Cre = Cte = 3.5 \, [\text{pF}]$$

$$Crb = Ctb = 0.35 \, [\text{pF}]$$

$$Crh = Cth = 0.35 \, [\text{pF}]$$

$$Crg = Ctg = 1.8 \, [\text{pF}]$$

$$Cri = Cti = 0.35 \, [\text{pF}]$$

For convenience of description, suppose in the following that the communication medium 130 is an object having characteristics close to those of a living body of about a size of a human body. Suppose that an electric resistance of the communication medium 130 from the position of the transmission signal electrode 111 to the position of the received signal electrode 121 is 1 [MΩ], and that the values of Rm 131 and Rm 133 are each 500 [KΩ]. Suppose that the value of the capacitance Cm 132 formed between the communication medium 130 and the space is 100 [pF]. Further, suppose that the signal source 113 generates a sine wave having a maximum value of 1 [V] and a frequency of 10 [MHz].

When a simulation is performed using the above parameters, a difference between a maximum value and a minimum value (a difference between peak values) of the waveform of a received signal is observed to be about 10 [μV]. Thus, by amplifying this by an amplifier (detector 123-2) having a sufficient gain, it is possible to reconstruct the signal of the transmitting side (signal generated in the signal source 113) on the receiving side.

Thus, the above-described communication system to which the present invention is applied eliminates a need for a physical reference point path, and can achieve communication by only a communication signal transmitting path. Therefore a communication environment not limited by a use environment can be readily provided.

Figure 4:
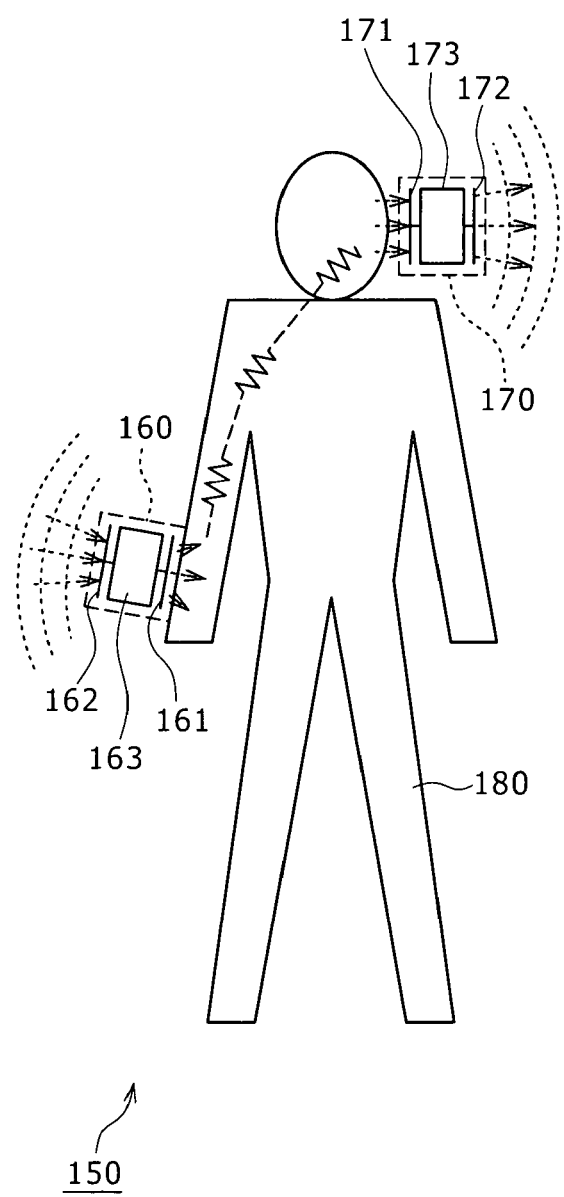
FIG. 4 is a diagram showing an example of actual use according to an embodiment of the communication system to which the present invention is applied.

A concrete example of application of a communication system as described above will next be described. For example, a communication system as described above can use a living body as a communication medium. FIG. 4 is a schematic diagram showing an example of a communication system when communication is performed via a human body. The communication system 150 in FIG. 4 is a system in which music data is transmitted from a transmitting device 160 attached to an arm part of a human body, and a receiving device 170 attached to a head part of the human body receives the music data, converts the music data into audio, and outputs the audio to allow the user to listen to the audio. The communication system 150 corresponds to the above-described communication systems (for example the communication system 1). The transmitting device 160 and the receiving device 170 correspond to the transmitting device 10 and the receiving device 20, respectively. The human body 180 in the communication system 150 is a communication medium, and corresponds to the communication medium 30 in FIG. 1.

Specifically, the transmitting device 160 has a transmission signal electrode 161, a transmission reference electrode 162, and a transmitting unit 163. The transmission signal electrode 161, the transmission reference electrode 162, and the transmitting unit 163 correspond to the transmission signal electrode 11, the transmission reference electrode 12, and the transmitting unit 13, respectively, in FIG. 1. The receiving device 170 has a received signal electrode 171, a reception reference electrode 172, and a receiving unit 173. The received signal electrode 171, the reception reference electrode 172, and the receiving unit 173 correspond to the received signal electrode 21, the reception reference electrode 22, and the receiving unit 23, respectively, in FIG. 1.

Thus, the transmitting device 160 and the receiving device 170 are placed such that the transmission signal electrode 161 and the received signal electrode 171 are in contact with or in proximity to the human body 180 as a communication medium. Since it suffices for the transmission reference electrode 162 and the reception reference electrode 172 to be in contact with a space, coupling with a ground in the vicinity or coupling between the transmitting device and the receiving device (or electrodes) is not required.

Figure 5:
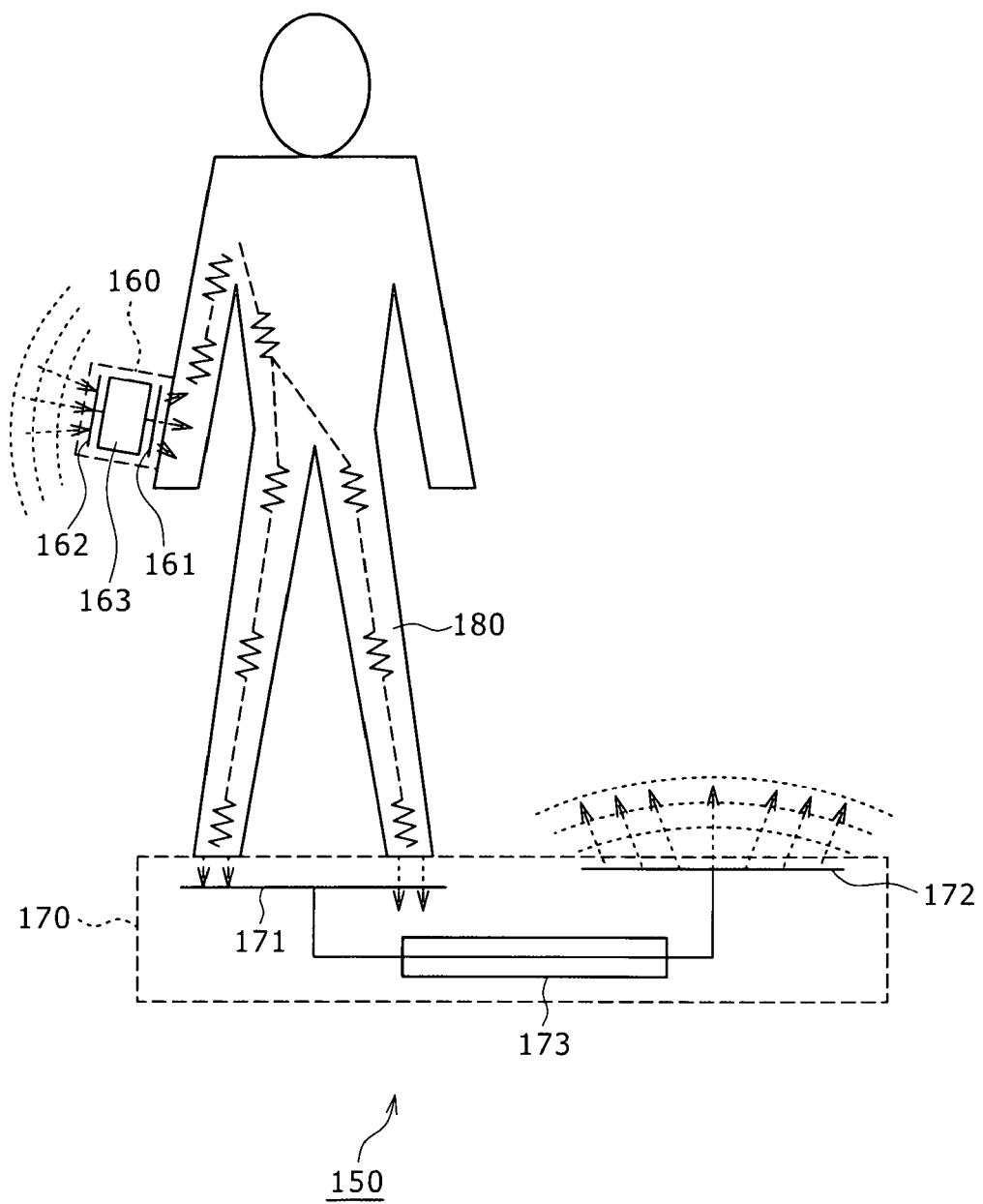
FIG. 5 is a diagram showing another example of use according to an embodiment of the communication system to which the present invention is applied.

FIG. 5 is a diagram of assistance in explaining another example of realizing the communication system 150. In FIG. 5, the receiving device 170 is in contact with (or in proximity to) a sole part of the human body 180, and communicates with the transmitting device 160 attached to an arm part of the human body 180. Also in this case, the transmission signal electrode 161 and the received signal electrode 171 are disposed so as to be in contact with (or in proximity to) the human body 180 as a communication medium, and the transmission reference electrode 162 and the reception reference electrode 172 are disposed so as to face the space. This application example cannot be realized by the conventional techniques using a ground as one communication path, in particular.

That is, the communication system 150 as described above eliminates the need for a physical reference point path, and can achieve communication by only a communication signal transmitting path. Therefore a communication environment not limited by a use environment can be readily provided.

In the communication system as described above, a method of modulation of a signal to be passed through the communication medium is not particularly limited as long as both the transmitting device and the receiving device can deal with the modulation method. An optimum method can be selected in consideration of characteristics of the communication system as a whole. Specifically, the modulation method may provide one of a baseband, an amplitude-modulated, and a frequency-modulated analog signal and a baseband, an amplitude-modulated, a frequency-modulated, and a phase-modulated digital signal, or a mixture of a plurality of signals.

Further, in the communication system as described above, a plurality of communications may be established using one communication medium, so that full-duplex communication, communication between a plurality of devices by a single communication medium, or the like can be performed.

Methods for realizing such multiplex communication include for example a spread spectrum system, a frequency band division system, a time division system and the like. By communicating using each such system, the communication system can perform simultaneous communication with a plurality of devices using the same communication medium, such for example as communication between a plurality of devices and a single device, communication between a plurality of devices and a plurality of devices, and the like. Further, two or more of the above-described methods may be combined with each other, of course.

It is particularly important in a specific application that the transmitting device and the receiving device can simultaneously communicate with a plurality of other devices. Assuming application to a ticket for a transportation, for example, when a user carrying both a device A having information on a commuter pass and a device B having an electronic money function uses an automatic ticket gate, a system as described above is used, and thereby simultaneous communication with the device A and the device B is performed. When a used section includes a section not covered by the commuter pass, the system can be used conveniently to deduct an amount of money that is lacking from the electronic money of the device B.

As described above, the transmitting device 10 and the receiving device 20 do not need to construct a closed circuit using a reference electrode, and can easily perform a stable communication process unaffected by an environment only by transmitting and receiving a signal via signal electrodes. Incidentally, since a structure for the communication process is simplified, the communication system 1 can easily use various communication systems such as modulation, encoding, encryption, multiplexing and the like in combination with each other.

When such a communication system is used to perform communication via the human body 180 as shown in FIG. 4, for example, it is preferable that the transmitting device and the receiving device be miniaturized as mobile devices. While a method of use is conceivable in which the transmitting device and the receiving device are for example fixed to an arm, a leg or the like using a belt or the like so that positional relation between the devices and the human body is stabilized, a method of use in which a user freely holds or places the transmitting device and the receiving device as in a case of a portable type telephone, for example, is also assumed. Therefore a higher degree of freedom of a wearing method (positional relation between the devices and the human body) is desirable, and widens a range of applications.

Figure 6:
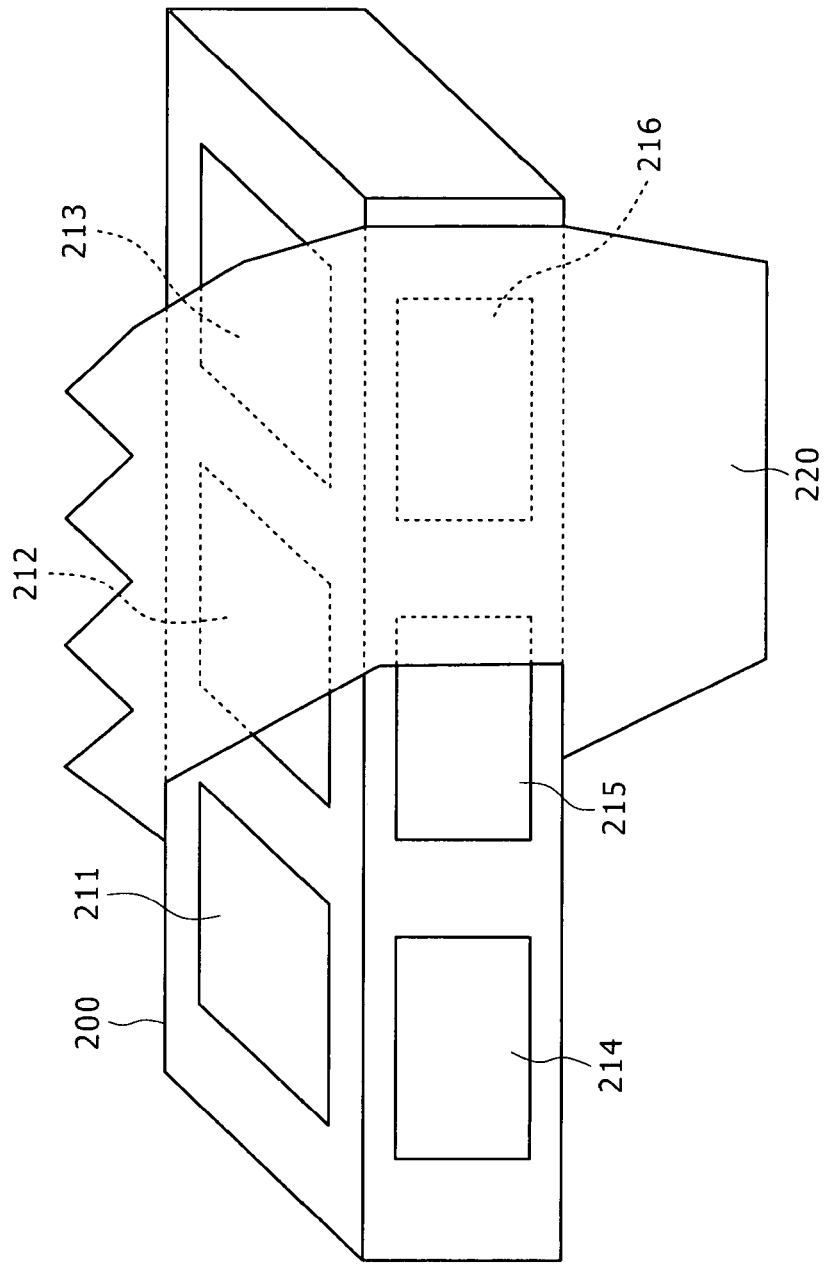
FIG. 6 is a perspective view of an example of external configuration of a communicating device.

For example, as shown in FIG. 6, a casing of the transmitting device 10 in FIG. 1 is formed as a casing 200. Electrodes 211 to 216 to be used as the transmission signal electrode 11 and the transmission reference electrode 12 are provided in external surfaces of the casing 200. When a user holds such a transmitting device by a hand 220, the transmitting device 10 can perform communication via the human body as shown in FIG. 4 or FIG. 5.

Incidentally, each of the electrodes 211 to 216 can be used as the transmission signal electrode 11 or the transmission reference electrode 12. That is, by controlling (changing) connections of the electrodes 211 to 216 to an internal circuit, the transmitting device 10 can use arbitrary electrodes as the transmission signal electrode 11, and use other arbitrary electrodes as the transmission reference electrode 12.

In such a case, however, it is not possible to predict how the user (the hand 220 of the user) holds the casing 200. Therefore, when the electrodes 211 to 216 are fixedly assigned the role of one of the transmission signal electrode 11 and the transmission reference electrode 12, both the transmission signal electrode 11 and the transmission reference electrode 12 may be close to the hand 220 as a communication medium in similar manners to each other depending on a holding state. In this case, a desirable communication environment may not be obtained.

Accordingly, the communication device 10 in FIG. 6 controls the connection of the electrodes 211 to 216 to the internal circuit according to the position of the hand 220 to thereby optimize the positional relation between the transmission signal electrode (electrodes used as the transmission signal electrode) and the transmission reference electrode (electrodes used as the transmission reference electrode) and the communication medium (hand 220). For example, in FIG. 6, the transmitting device 10 connects the electrode 212, the electrode 213, the electrode 215, and the electrode 216 covered by the hand 220 to the internal circuit so that the electrode 212, the electrode 213, the electrode 215, and the electrode 216 are used as the transmission signal electrode 11, and connects the other electrodes 211 and 214 to the internal circuit so that the electrodes 211 and 214 are used as the transmission reference electrode 12. In other words, the communication device 10 performs control so as to optimize the positional relation between the communication medium and the electrode pair (electrode pair formed by the transmission signal electrode 11 and the transmission reference electrode 12).

Incidentally, the transmitting device 10 can control the connection so as to use a plurality of electrodes as the transmission signal electrode 11 or the transmission reference electrode 12. In addition, the transmitting device 10 does not need to make connection so as to use all the electrodes as the transmission signal electrode 11 or the reception reference electrode 12, and there may be unconnected electrodes. In the case of FIG. 6, for example, electrodes only partly covered by the hand 220, such as the electrode 212, the electrode 213, and the electrode 215, may be disconnected. By thus controlling the connection, the transmitting device 10 is for example able to use only electrodes that can be clearly distinguished as electrodes capacitively coupled with the communication medium strongly or weakly among a group of electrodes as the transmission signal electrode 11 or the transmission reference electrode 12, and not to use electrodes capacitively coupled with the communication medium to a medium degree (electrodes that cannot be clearly distinguished as electrodes to be used as the transmission signal electrode 11 or to be used as the transmission reference electrode 12). The transmitting device 10 can thereby set the transmission signal electrode 11 and the transmission reference electrode having an optimum positional relation to the communication medium.

Figure 7:
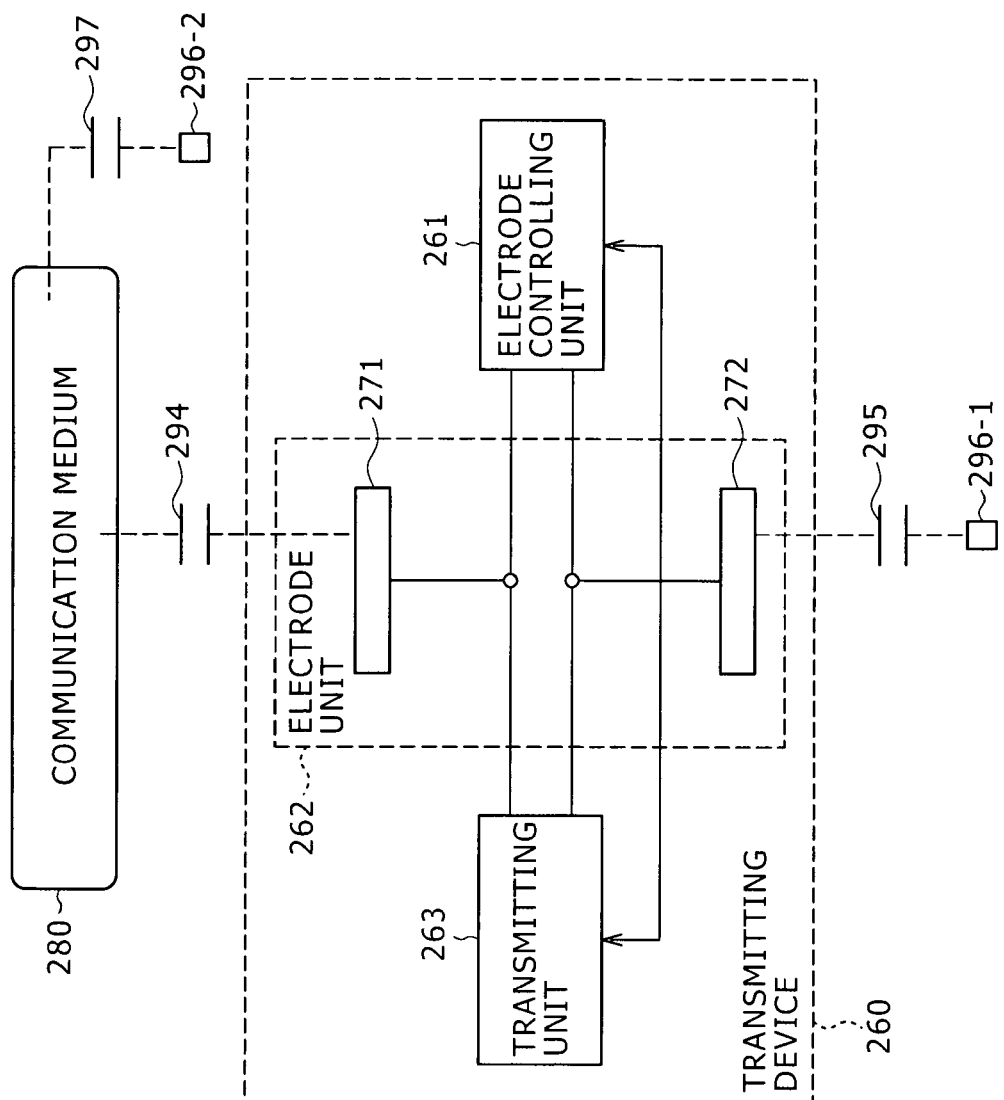
FIG. 7 is a block diagram showing an example of internal configuration of a transmitting device.

FIG. 7 is a block diagram showing an example of configuration of an embodiment of the transmitting device in this case.

The transmitting device 260 in FIG. 7 has an electrode controlling unit 261, an electrode unit 262, and a transmitting unit 263. The electrode unit 262 has an electrode 271 and an electrode 272 as a pair of electrodes having the shape of a disk, for example, and capacitively coupled with an outside. The electrode controlling unit 261 controls connection of each electrode of the electrode unit 262 to the transmitting unit 263. The transmitting unit 263 performs a process of transmitting a signal via the electrode unit 262.

The transmitting device 260 corresponds to the transmitting device 10 in FIG. 1. The transmitting device 260 outputs a signal to a communication medium 280 corresponding to the communication medium 30, using electrostatic induction, and thereby transmits the signal to a receiving device via the communication medium 280, which is a conductor or a dielectric. The electrode pair of the electrode 271 and the electrode 272 of the electrode unit 262 corresponds to the electrode pair of the transmission signal electrode 11 and the transmission reference electrode 12 in FIG. 1. The transmitting unit 263 corresponds to the transmitting unit 13 in FIG. 1.

That is, one of the electrode 271 and the electrode 272 is connected as the transmission signal electrode 11 to the transmitting unit 263, and the other is connected as the transmission reference electrode 12 to the transmitting unit 263. The electrode controlling unit 262 checks a state of capacitive coupling (magnitude of capacitance) of the electrode 271 and the electrode 272 with the external part, and controls the connection of the electrode 271 and the electrode 272 to the transmitting unit 263 to be optimized according to the state.

For example, suppose that as shown in FIG. 7, the communication medium 280 serving as a communication path and having conductivity or dielectric properties approaches the electrode 271. At this time, the electrode 272 is facing a free space, and forms a capacitance Ctg 295 with the free space. On the other hand, as the communication medium 280 approaches the electrode 271, capacitive coupling of the electrode 271 with the free space is weakened, and capacitive coupling of the electrode 271 with the communication medium 280 becomes dominant. When the communication medium 280 is a conductor or an object having a higher dielectric constant than air, a capacitance Cte 294 viewed from the electrode 271 is larger than the capacitance Ctg 295. Hence, when some signal is supplied to the electrodes, the magnitude of a load attached to the paths is known on the basis of the magnitude of signal level of the load. In the case of the free space, the capacitance is low, and thus the signal level of the load is low. In the case of a conductor or a dielectric, the capacitance is high, and thus the signal level of the load is higher.

The capacitance as viewed from the electrode is thus changed, and thereby the signal level (magnitude of amplitude) detected when a signal is applied to the electrode is changed. Thus, by detecting the signal level, the electrode controlling unit 261 can grasp a state of the electrode (whether the communication medium 280 is in the vicinity or not). The electrode controlling unit 261 controls the connection between the transmitting unit 263 and the electrode unit 262 according to the state of each electrode which state is thus grasped.

The transmitting unit 263 connects each of the electrode 271 and the electrode 272 of the electrode unit 262 as the transmission signal electrode or the transmission reference electrode under control of the electrode controlling unit 261.

Figure 8:
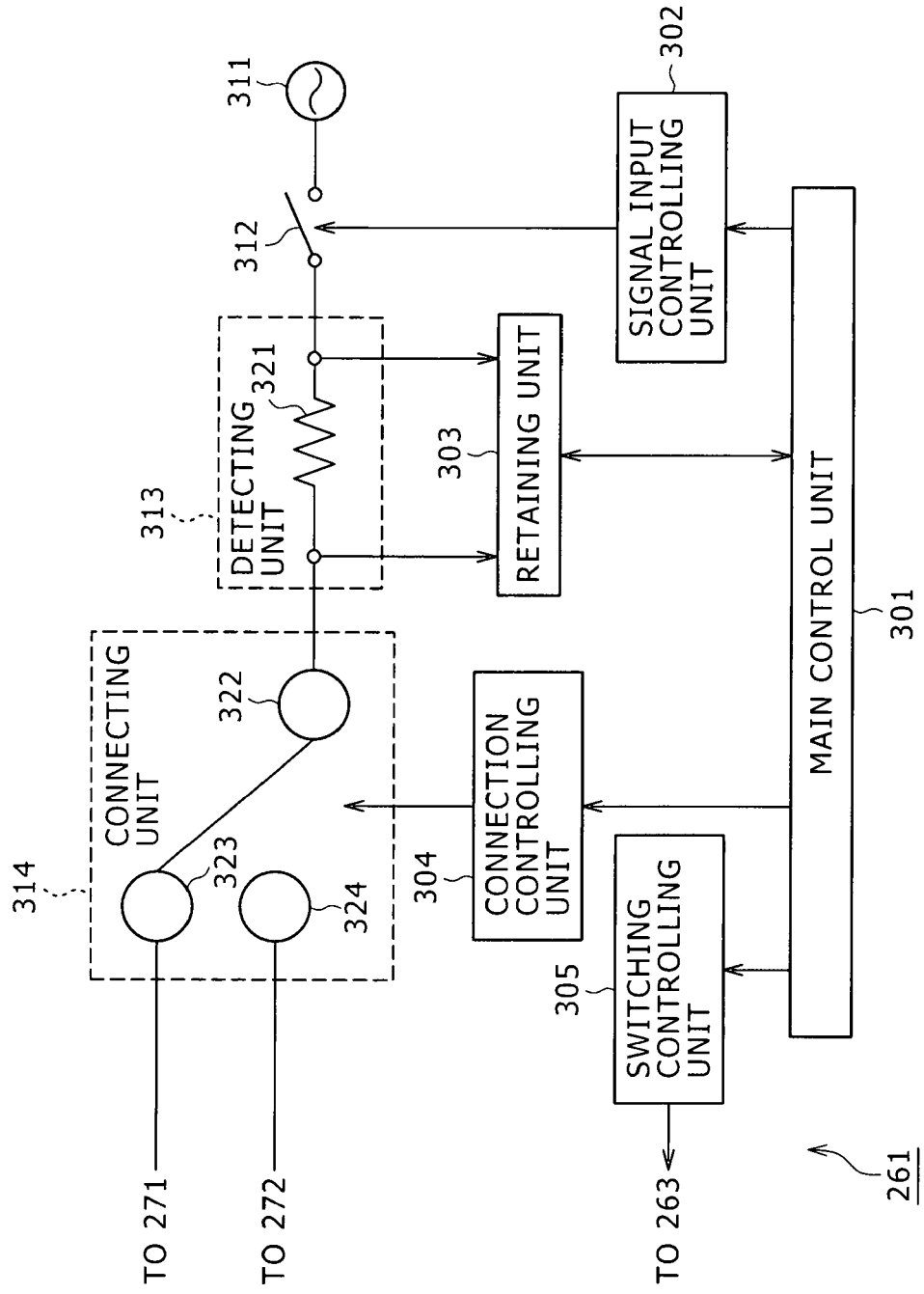
FIG. 8 is a block diagram showing an example of detailed configuration of an electrode controlling unit in FIG. 7.

FIG. 8 is a block diagram showing an example of detailed configuration of the electrode controlling unit 261 in FIG. 7. The electrode controlling unit 261 in FIG. 8 has a main control unit 301, a signal input controlling unit 302, a retaining unit 303, a connection controlling unit 304, a switching controlling unit 305, a signal source 311, a switch 312, a detecting unit 313, and a connecting unit 314.

The main control unit 301 performs a process of controlling the connection between the electrode unit 262 and the transmitting unit 263 by controlling various parts within the electrode controlling unit 261, for example the signal input controlling unit 302, the retaining unit 303, the connection controlling unit 304, and the switching controlling unit 305. The signal input controlling unit 302 is controlled by the main control unit 301 to turn on or off the switch 312. The signal input controlling unit 302 thereby controls input of a signal generated in the signal source 311 to each electrode of the electrode unit 262.

The retaining unit 303 is controlled by the main control unit 301 to retain a signal level detected in the detecting unit 313 and supply the value to the main control unit 301 as required. The connection controlling unit 304 is controlled by the main control unit 301 to control the switching of connection by the connecting unit 314. The switching controlling unit 305 is controlled by the main control unit 301 to supply information for controlling the connection between the electrode unit 262 and the transmitting unit 263 to the transmitting unit 263. The switching controlling unit 305 thereby controls the connection between the electrode unit 262 and the transmitting unit 263.

The signal source 311 supplies a signal of a predetermined frequency to the switch 312. The switch 312 is controlled by the signal input controlling unit 302 to supply the signal from the signal source 311 to the detecting unit 313, or to stop the supply. The detecting unit 313 has a load resistance 321 having a predetermined resistance value within the detecting unit 313. The detecting unit 313 can detect a potential across the load resistance 321. That is, information on the potential across the load resistance 321 is supplied to the retaining unit 303. The retaining unit 303 obtains a signal level applied to an electrode on the basis of the information on the potential across the load resistance 321, and retains the value.

The connecting unit 314 has a kind of multi-contact switch. The multi-contact switch changes connection between a terminal 322 connected to the detecting unit 313 and a plurality of terminals provided for each electrode. In the case of FIG. 8, for example, the terminal 323 is connected to the electrode 271, and the terminal 324 is connected to the electrode 272. That is, the connecting unit 314 is controlled by the connection controlling unit 304 to perform switching so as to connect the terminal 322 to the terminal 323 or the terminal 324 or not to connect the terminal 322 to the terminal 323 or the terminal 324. The connecting unit 314 thereby performs switching so as to supply the signal from the signal source 311 to the electrode 271 or the electrode 272, or not to supply the signal from the signal source 311 to the electrode 271 or the electrode 272.

In a mode of checking capacitive coupling of each electrode, the main control unit 301 controls the connection controlling unit 304 to sequentially connect the terminal 322 in the connecting unit 314 to each of the terminal 323 and the terminal 324, and finally release the connection and set an open state. In addition, the main control unit 301 controls the signal input controlling unit 302 in each of these states (the state of the terminal 322 being connected to the terminal 323, the state of the terminal 322 being connected to the terminal 324, and the state of the terminal 322 being unconnected), so that the switch is turned on for a predetermined time to apply the signal. The detecting unit 313 detects the signal level of each signal thus applied, and then supplies the signal level to the retaining unit 303 to make the signal level retained by the retaining unit 303. When obtaining the result of detection of the signal level from the retaining unit 303, the main control unit 301 supplies the result of detection of the signal level as control information to the transmitting unit 263 via the switching controlling unit 305.

Figure 9:
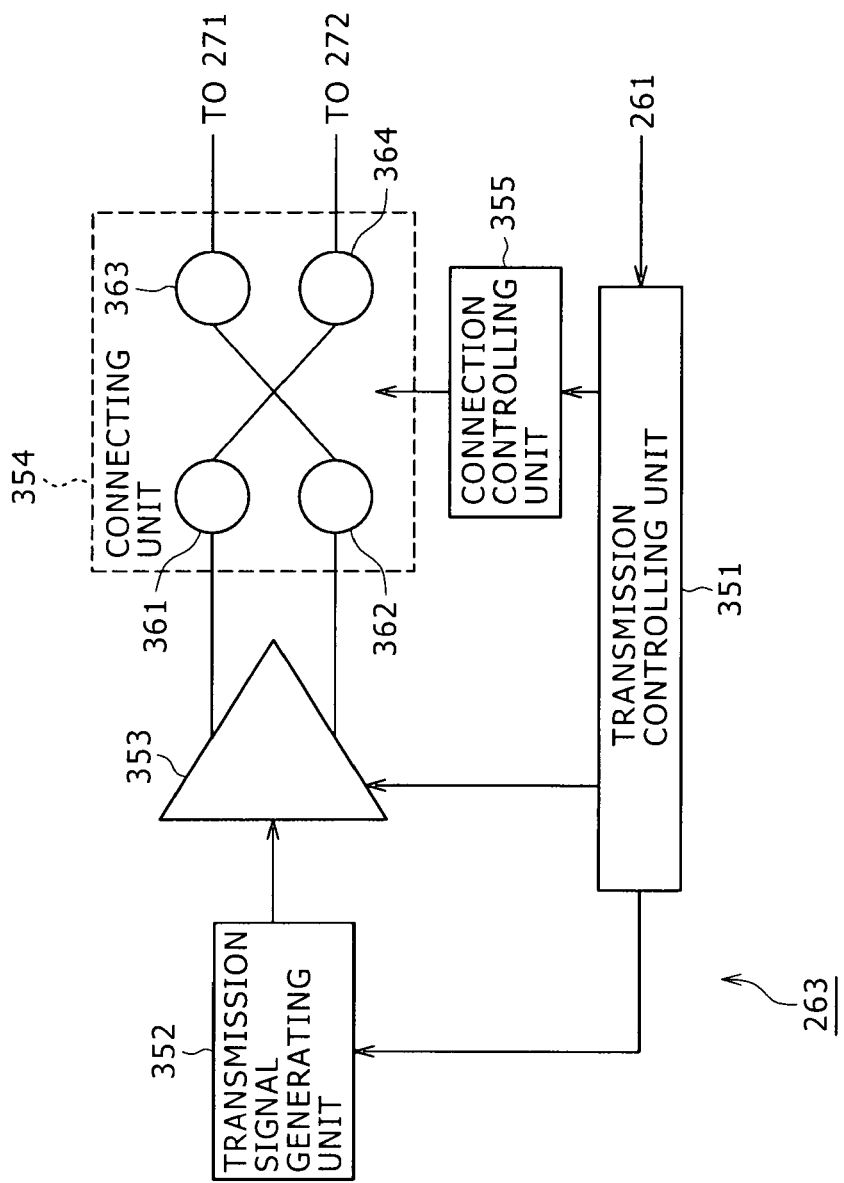
FIG. 9 is a block diagram showing an example of detailed configuration of a transmitting unit in FIG. 7.

FIG. 9 is a block diagram showing an example of detailed configuration of the transmitting unit 263 in FIG. 7.

The transmitting unit 263 in FIG. 9 has a transmission controlling unit 351, a transmission signal generating unit 352, an amplifying unit 353, a connecting unit 354, and a connection controlling unit 355.

The transmission controlling unit 351 controls each part within the transmitting unit 263 to thereby perform a control process for signal transmission, such as controlling connection to the electrode unit 262 and outputting a transmission signal, on the basis of the control information supplied from the electrode controlling unit 261 (the switching controlling unit 305 in the electrode controlling unit 261).

The transmission signal generating unit 352 can generate a plurality of kinds of transmission signals, for example. The transmission signal generating unit 352 generates a transmission signal corresponding to transmission information indicated by the transmission controlling unit 351, and then supplies the transmission signal to the amplifying unit 353. The amplifying unit 353 is formed by an operational amplifier or the like. Under control of the transmission controlling unit 351, the amplifying unit 353 amplifies the transmission signal supplied from the transmission signal generating unit 352, and then supplies the transmission signal to the connecting unit 354 to supply the transmission signal to the transmission signal electrode and the transmission reference electrode. The connecting unit 354 has a multi-contact switch for switching connection between output terminals of the amplifying unit 353 and electrodes. That is, under control of the connection controlling unit 355, the connecting unit 354 connects each of the output terminal 361 and the output terminal 362 of the amplifying unit 353 to one of a terminal 363 and a terminal 364 (terminals different from each other), or disconnect (open) both the output terminal 361 and the output terminal 362. In the example of FIG. 9, the connecting unit 354 connects the output terminal 361 of the amplifying unit 353 for the transmission signal electrode to the terminal 364 (electrode 272), and connects the output terminal 362 for the transmission reference electrode to the terminal 363 (electrode 271). That is, in this case, the electrode 271 acts as the transmission reference electrode, and the electrode 272 acts as the transmission signal electrode.

For example, in a mode of transmitting a signal, on the basis of the control information generated and supplied by the electrode controlling unit 261 in the mode of checking the capacitive coupling of each electrode, the transmission controlling unit 351 controls the connection controlling unit 355 to connect each terminal of the connecting unit 354 and thereby determine the transmission signal electrode and the transmission reference electrode. When the connection to the electrode unit 262 is established, the transmission controlling unit 351 controls the transmission signal generating unit 352 to generate a transmission signal, controls the amplifying unit 353 to amplify the transmission signal, and then makes the transmission signal output from the electrode unit 262 to the communication medium 280 via the connecting unit 354.

As described above, the transmitting device 260 performs optimization by switching the transmission signal electrode and the transmission reference electrode according to a state of capacitive coupling of each electrode, and then transmits a signal. Therefore the signal can be transmitted to the receiving device stably irrespective of positional relation to the human body of a user as communication medium.

A flow of a process for such control of the electrodes will next be described. First, a flow of an electrode controlling process in a transmission process performed by the transmitting device 260 will be described with reference to a flowchart of FIG. 10.

While the transmission process is performed, the main control unit 301 in step S1 controls the transmission controlling unit 351 in the transmitting unit 263 via the switching controlling unit 305 to stop transmitting a signal, with predetermined timing or a predetermined process as a cue. According to an instruction from the main control unit 301, the transmission controlling unit 351 controls the transmission signal generating unit 352 to stop generating the signal.

When the generation of the signal is stopped, the main control unit 301 advances the process to step S2, where the main control unit 301 performs the electrode controlling process for controlling the connection between the electrode unit 262 and the transmitting unit 263. Details of the electrode controlling process will be described later. When the electrode controlling process is ended, the main control unit 301 advances the process to step S3, where the main control unit 301 controls the transmission controlling unit 351 in the transmitting unit 263 via the switching controlling unit 305 to start transmitting a signal. According to an instruction from the main control unit 301, the transmission controlling unit 351 controls the transmission signal generating unit 352 to start generating the signal.

When the transmission of the signal is ended, the main control unit 301 ends the transmission process.

As described above, the signal is transmitted, and optimization is performed by switching the transmission signal electrode and the transmission reference electrode according to a state of capacitive coupling of each electrode. Therefore the main control unit 301 can transmit the signal to the receiving device stably irrespective of positional relation between the transmitting device 260 and the communication medium 280.

Figure 10:
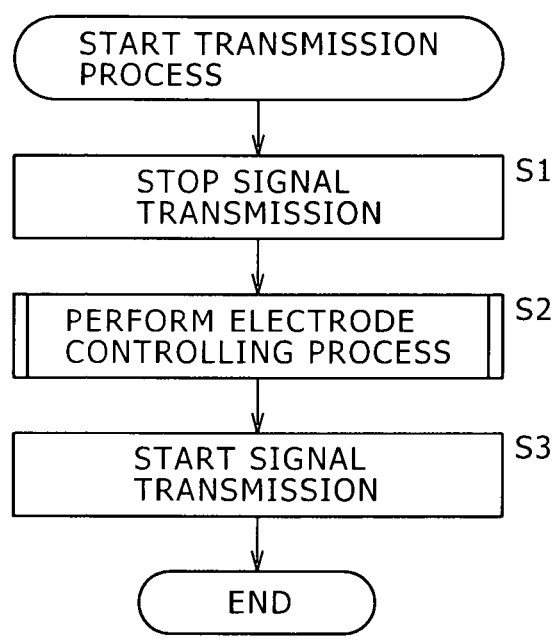
FIG. 10 is a flowchart of assistance in explaining a flow of a transmission process.
Figure 11:
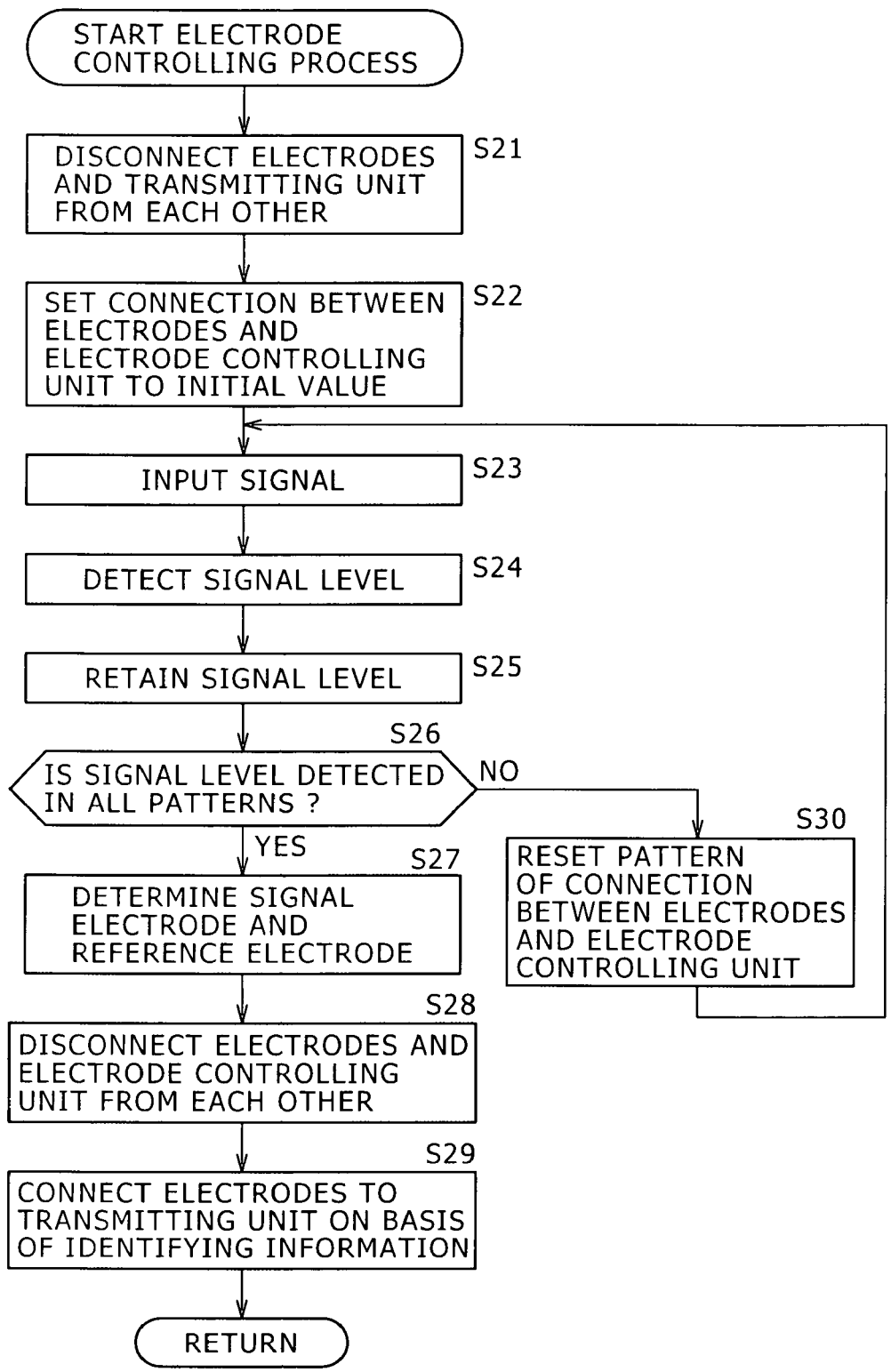
FIG. 11 is a flowchart of assistance in explaining a flow of an electrode controlling process.

Details of the electrode controlling process performed in step S2 in FIG. 10 will next be described with reference to a flowchart of FIG. 11.

When the electrode controlling process is started, the main control unit 301 in step S21 controls the transmitting unit 263 via the switching controlling unit 305 to disconnect the electrodes and the transmitting unit from each other. Under the control, the transmission controlling unit 351 in the transmitting unit 263 makes each terminal of the connecting unit 354 opened, thereby disconnecting the electrode unit 262 and the transmitting unit 263 from each other.

After each electrode and the transmitting unit 263 are disconnected from each other, the main control unit 301 in step S22 controls the connecting unit 314 via the connection controlling unit 304 to set the connection between the electrode unit 262 and the electrode controlling unit 261 to an initial value. That is, the main control unit 301 controls the connecting unit 314 to connect the electrode to be checked first to the detecting unit 313. Then, the main control unit 301 in step S23 controls the signal input controlling unit 302 to set the switch 312 in an on state, whereby a signal generated in the signal source 311 is input to the detecting unit 313. The signal is supplied to an electrode of the electrode unit 262 via the detecting unit 313 and the connecting unit 314. The detecting unit 313 in step S24 detects a potential difference across the load resistance 321 as a signal level, and supplies information on the potential difference to the retaining unit 303. The retaining unit 303 in step S25 retains the information on the potential difference as signal level.

In step S26, the main control unit 301 determines whether the signal level is detected in all patterns. When the main control unit 301 determines that the detection is completed, the main control unit 301 advances the process to step S27, where the main control unit 301 obtains the detected signal level from the retaining unit 303, and selects each of the electrodes of the electrode unit 262 as an electrode to be used as the transmission signal electrode or as an electrode to be used as the transmission reference electrode on the basis of the obtained signal level. For example, when the signal level is a predetermined threshold value or higher, the capacitance formed between the electrode and the surroundings is large, and therefore the main control unit 301 determines that the communication medium 280 is in proximity, and selects the electrode as the transmission signal electrode. Conversely, for example, when the signal level is lower than the predetermined threshold value, the capacitance formed between the electrode and the surroundings is small, and therefore the main control unit 301 determines that the electrode is capacitively coupled with the space, and selects the electrode as the transmission reference electrode.

The main control unit 301 in step S28 controls the connecting unit 314 via the connection controlling unit 304 to open all the terminals and thereby disconnect the electrode unit 262 and the electrode controlling unit 261 from each other. Then, the main control unit 301 supplies identifying information for the transmission signal electrode and the transmission reference electrode which information indicates which electrode is to be used as the transmission signal electrode or the transmission reference electrode to the transmission controlling unit 351 in the transmitting unit 263 via the switching controlling unit 305. The transmission controlling unit 351 in step S29 controls the connecting unit 354 to connect the electrodes of the electrode unit 262 to the transmitting unit 263 on the basis of the supplied identifying information. That is, the electrode unit 262 is thereby connected to the transmitting unit 263 by a method optimized on the basis of checks by the electrode controlling unit 261. When the process of step S29 is ended, the main control unit 301 ends the electrode controlling process.

Incidentally, when the main control unit 301 determines in step S26 that the signal level is not detected in all the patterns (signal levels for all the electrodes are not detected), the main control unit 301 in step S30 controls the connecting unit 314 via the connection controlling unit 304 to reset a pattern of connection between the electrode unit 262 and the electrode controlling unit 261. That is, the connecting unit 314 connects the terminal 322 connected to the detecting unit 313 to the terminal for the electrode to be checked next. After the process of step S30 is ended, the main control unit 301 returns the process to step S23 to perform the process for the new electrode.

That is, each part of the electrode controlling unit 261 repeatedly performs the processes of steps S23 to S26 and step S30 to check a state of capacitive coupling of each electrode. When the checking of all the electrodes is thereafter ended, the main control unit 301 performs the process from step S27 on down to optimize the connection between the electrode unit 262 and the transmitting unit 263.

Because the electrode controlling process is performed as described above, the main control unit 301 can determine for each of the electrodes whether to use the electrode as the transmission reference electrode or whether to use the electrode as the transmission signal electrode, and a signal can be transmitted to the receiving device stably irrespective of the positional relation between the transmitting device 260 and the communication medium 280.

Incidentally, there may be three or more electrodes in the electrode unit 262. In this case, the transmitting device 260 can control selection of an electrode pair by switching the connecting unit 354. That is, in this case, the transmitting device 260 does not need to determine an electrode to be used as the transmission signal electrode and an electrode to be used as the transmission reference electrode in such a manner as to distinguish the electrodes from each other; it suffices to determine which plurality of electrodes among the group of electrodes of the electrode unit 262 are to be used as a pair of the transmission signal electrode and the transmission reference electrode. That is, in this case, of the electrodes connected to the output terminal 361 and the output terminal 362, the electrode nearer to the communication medium 280 acts as the transmission signal electrode as a consequence, and the electrode more distant from the communication medium 280 acts as the transmission reference electrode as a consequence. Therefore the output terminal for the transmission reference electrode and the output terminal for the transmission signal electrode do not need to be differentiated from each other.

In addition, the transmitting device 260 may specify and use a plurality of electrodes as the transmission signal electrode, and specify and use a plurality of electrodes as the transmission reference electrode. In addition, the transmitting device 260 may specify electrodes to be used as the transmission signal electrode and electrodes to be used as the transmission reference electrode such that the electrodes to be used as the transmission signal electrode and the electrodes to be used as the transmission reference electrode are different from each other in number.

While the transmitting device has been described above, the present invention can be similarly adapted to the receiving device corresponding to the transmitting device. That is, the receiving device can also change (control) connection between electrodes and an internal circuit such that positional relation between the received signal electrode and the reception reference electrode and the communication medium is optimized according to positional relation between the receiving device and the communication medium. Hence, the description of the electrode connection control in the transmitting device described above with reference to FIG. 6 can be applied to the receiving device. In addition, arrangement relation of the electrodes is arbitrary. Further, the magnitudes of surface areas and shapes of the electrodes are arbitrary, and may be different from each other, of course.

Figure 12:
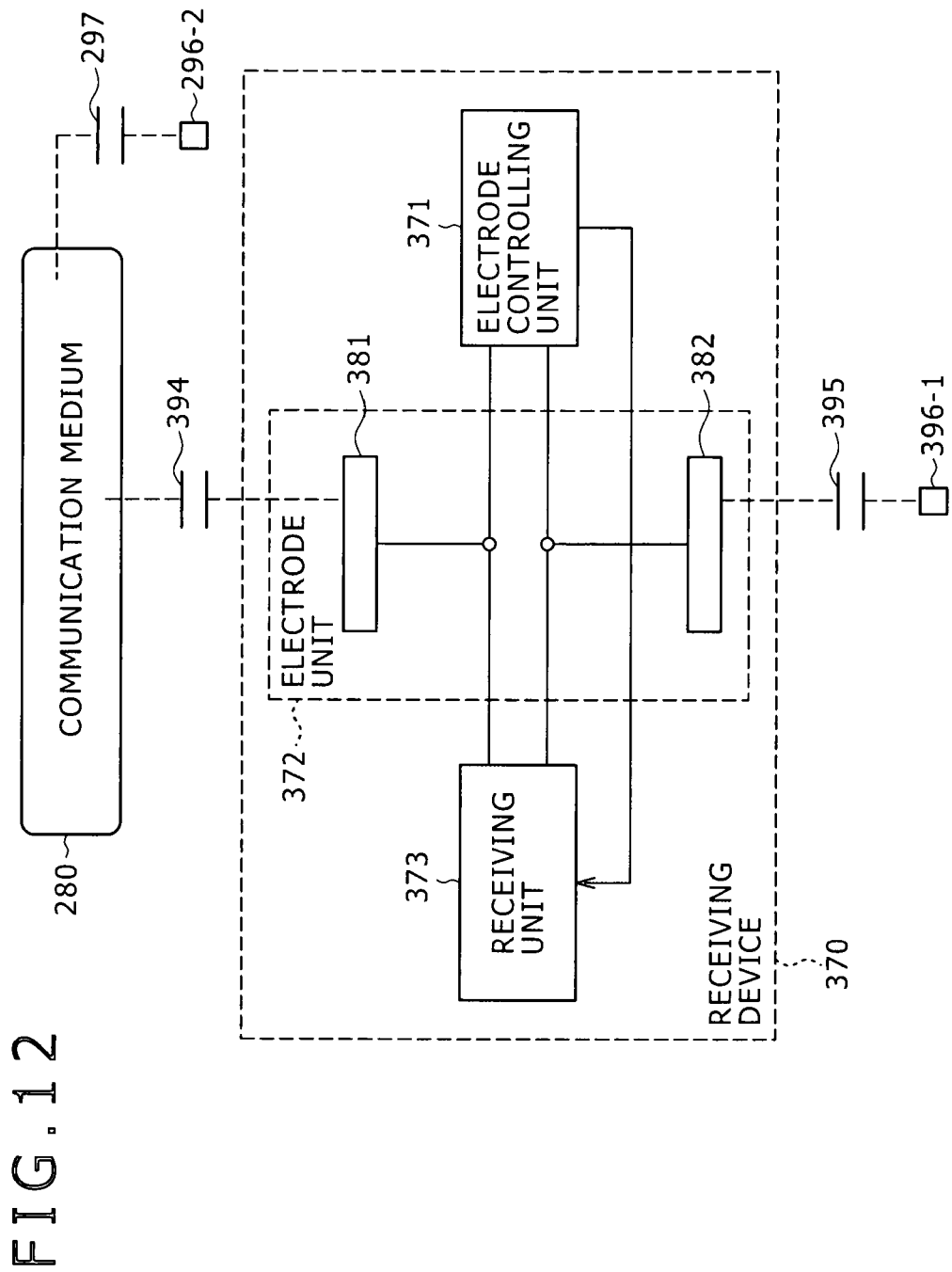
FIG. 12 is a block diagram showing an example of internal configuration of a receiving device.

FIG. 12 is a block diagram showing an example of internal configuration of an embodiment of such a receiving device.

A receiving device 370 in FIG. 12 corresponds to the transmitting device 260, and receives a signal supplied by the transmitting device 260 via the communication medium 280. The receiving device 370 mainly has an electrode controlling unit 371, an electrode unit 372, and a receiving unit 373.

The electrode controlling unit 371 is a processing unit corresponding to the electrode controlling unit 261 in the transmitting device 260 shown in FIG. 7. The electrode controlling unit 371 controls connection between the receiving unit 373 and the electrode unit 372. Specifically, the electrode controlling unit 371 checks a state of capacitive coupling of each electrode in the electrode unit 372, identifies the electrode to be used as received signal electrode and the electrode to be used as reception reference electrode, and then supplies identifying information identifying the electrodes as control information to the receiving unit 373. The electrode controlling unit 371 has basically the same configuration and operation as the electrode controlling unit 261. The description above made with reference to FIG. 7 and the block diagram and the description of the electrode controlling unit 261 shown in FIG. 8 can be applied to the electrode controlling unit 371, and therefore description thereof will be omitted.

The electrode unit 372 corresponds to the electrode unit 262 in the transmitting device 260 shown in FIG. 7. As with the electrode unit 262, the electrode unit 372 has an electrode 381 and an electrode 382 as a pair of electrodes having the shape of a disk, for example, and capacitively coupled with an outside. The receiving unit 373 corresponds to the transmitting unit 263 in the transmitting device 260 shown in FIG. 7. The receiving unit 373 performs a process of receiving a signal via the electrode unit 372 instead of the transmission process.

For example, suppose that as shown in FIG. 12, the communication medium 280 serving as a communication path and having conductivity or dielectric properties approaches the electrode 381. At this time, the electrode 382 is facing a free space, and forms a capacitance Crg 395 with the free space. On the other hand, as the communication medium 280 approaches the electrode 381, capacitive coupling of the electrode 381 with the free space is weakened, and capacitive coupling of the electrode 381 with the communication medium 280 becomes dominant. When the communication medium 280 is a conductor or an object having a higher dielectric constant than air, a capacitance Cre 394 viewed from the electrode 381 is larger than the capacitance Crg 395. Hence, when some signal is supplied to the electrodes, the magnitude of a load attached to the paths is known on the basis of the magnitude of signal level of the load. In the case of the free space, the capacitance is low, and thus the signal level of the load is low. In the case of a conductor or a dielectric, the capacitance is high, and thus the signal level of the load is higher.

The capacitance as viewed from the electrode is thus changed, and thereby the signal level (magnitude of amplitude) detected when a signal is applied to the electrode is changed. Thus, as with electrode controlling unit 261, by detecting the signal level, the electrode controlling unit 371 can grasp a state of the electrode (whether the communication medium 280 is in the vicinity or not). The electrode controlling unit 371 controls the connection between the receiving unit 373 and the electrode unit 372 according to the state of each electrode which state is thus grasped.

Incidentally, the pattern of connection of the terminals in the connecting unit 354 shown in FIG. 9 is an example of connection. In practice, the connecting unit 354 is controlled by the connection controlling unit 355 as described above to change the connection of each terminal in a plurality of connection patterns including a connection pattern shown in FIG. 13.

Figure 13:
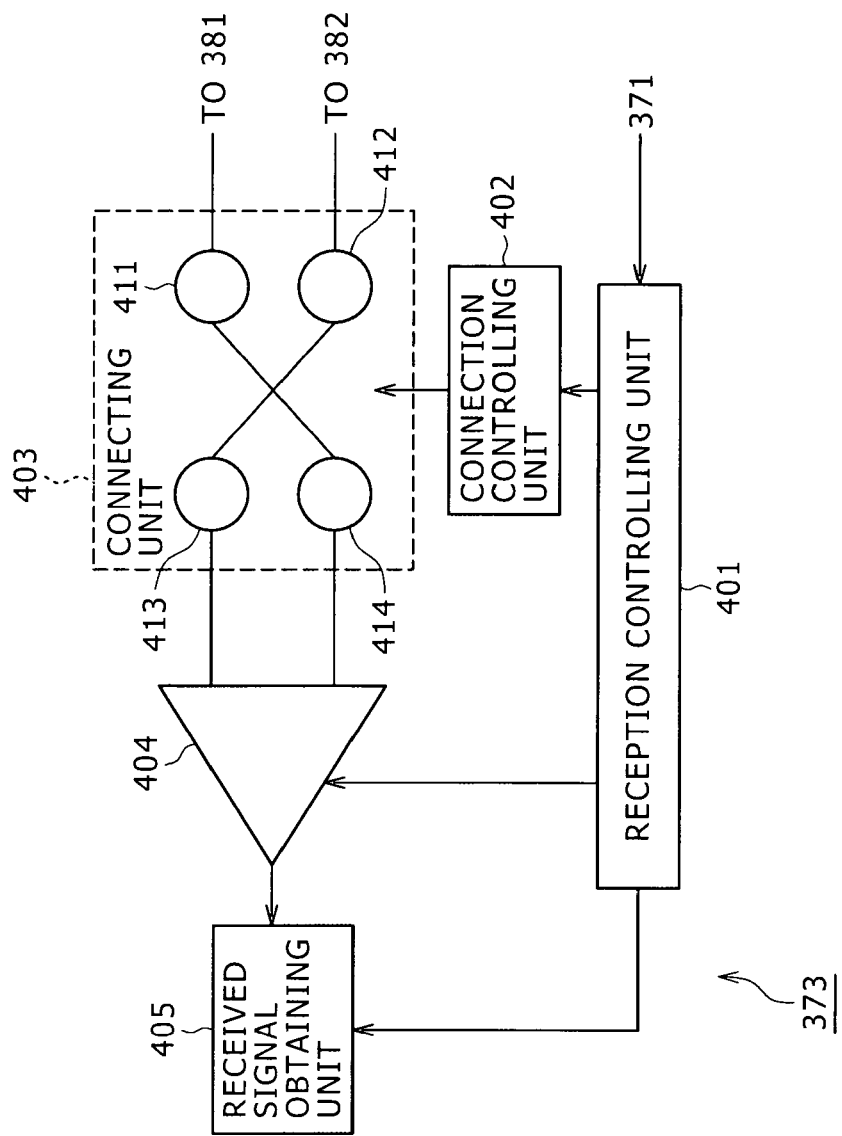
FIG. 13 is a block diagram showing an example of detailed configuration of a receiving unit in FIG. 12.

FIG. 13 is a block diagram showing an example of detailed configuration of the receiving unit 373. The receiving unit 373 in FIG. 13 has a reception controlling unit 401, a connection controlling unit 402, a connecting unit 403, an amplifying unit 404, and a received signal obtaining unit 405.

On the basis of the control information supplied from the electrode controlling unit 371 (identifying information identifying the electrode to be used as the received signal electrode and the electrode to be used as the reception reference electrode in the electrode group of the electrode unit 372), the reception controlling unit 401 controls the connecting unit 403 via the connection controlling unit 402 to connect a terminal 413 connected to a terminal of the amplifying unit 404 for the received signal electrode to the received signal electrode, and connect a terminal 414 connected to a terminal of the amplifying unit 404 for the reception reference electrode to the reception reference electrode. In the case of FIG. 13, the connecting unit 403 connects the terminal 413 to a terminal 412 connected to the electrode 382, and connects the terminal 414 to a terminal 411 connected to the electrode 381. That is, in this case, the electrode 381 is connected so as to act as the received signal electrode, and the electrode 382 is connected so as to act as the reception reference electrode.

In addition, the reception controlling unit 401 controls the amplifying unit 404 as required to amplify a received signal and then supply the received signal to the received signal obtaining unit 405, and controls the received signal obtaining unit 405 as required to obtain the amplified received signal.

As described above, the receiving device 370 controls the electrodes in the same manner as the transmitting device 260. That is, the receiving device 370 performs a reception process in a similar manner to the transmission process shown in the flowchart of FIG. 10. The receiving device 370 stops signal reception, and then performs the electrode controlling process. After the electrode controlling process is ended, the receiving device 370 resumes signal reception. The receiving device 370 performs an electrode controlling process as in the case of the electrode controlling process represented in the flowchart of FIG. 11. The receiving device 370 inputs a signal to each electrode, grasps a state of capacitive coupling of each electrode on the basis of a signal level obtained, and then determines the received signal electrode and the reception reference electrode.

As described above, the signal is received, and optimization is performed by switching the received signal electrode and the reception reference electrode according to the state of the capacitive coupling of each electrode. Therefore the reception controlling unit 401 enables a signal transmitted from the transmitting device to be received stably irrespective of positional relation between the receiving device 370 and the communication medium 280.

Figure 14:
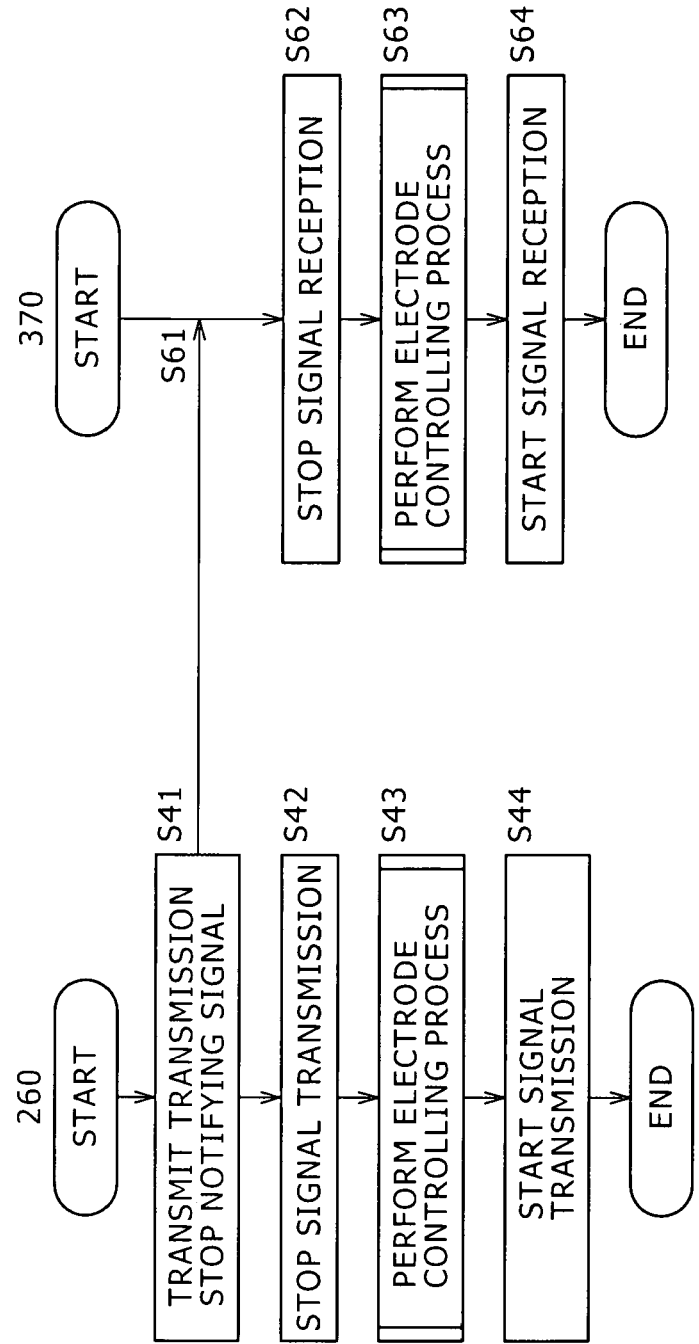
FIG. 14 is a flowchart of assistance in explaining a flow of a transmission and reception process.

Incidentally, the electrode controlling process may be performed while the transmitting device 260 and the receiving device 370 performing communication are synchronized with each other. A flow of the process in this case will be described with reference to a flowchart of FIG. 14.

The transmitting device 260 that has been performing the transmission process first transmits a transmission stop notifying signal to the receiving device 370 in step S41 to notify the receiving device 370 that the transmission process will be stopped. When the notification is completed, the transmitting device 260 advances the process to step S42, where the transmitting device 260 stops signal transmission. The transmitting device 260 performs the electrode controlling process described with reference to the flowchart of FIG. 11 in step S43.

When the receiving device 370 in step S61 receives the transmission stop notifying signal transmitted in step S41 by the transmitting device 260, the receiving device 370 advances the process to step S62, whereby the receiving device 370 stops signal reception. The receiving device 370 thereafter performs the electrode controlling process described with reference to the flowchart of FIG. 11 in step S63.

After the electrode controlling process in step S43 is ended, and thus the connection between the electrode unit 262 and the transmitting unit 263 is optimized, the transmitting device 260 advances the process to step S44, where the transmitting device 260 starts signal transmission. Then the process is ended.

After the receiving device 370 ends the electrode controlling process, and thus optimizes the connection between the electrode unit 372 and the receiving unit 373, the receiving device 370 advances the process to step S64, where the receiving device 370 starts signal reception. Then the process is ended.

As described above, the transmitting device 260 and the receiving device 370 synchronize timing of performing the electrode controlling process with each other. Thereby, the transmitting device 260 and the receiving device 370 reduce problems in communication such for example as a case where the transmitting device 260 transmits a signal while the receiving device 370 is performing the electrode controlling process. Therefore the communication process can be performed more efficiently and more accurately.

Incidentally, while in the above description, the electrode unit 372 has two electrodes (the electrode 381 and the electrode 382), the present invention is not limited to this, and the number of such electrodes may be three or more. In this case, the receiving device 370 can control selection of an electrode pair by switching the connecting unit 403. That is, in this case, the receiving device 370 does not need to determine an electrode to be used as the received signal electrode and an electrode to be used as the reception reference electrode in such a manner as to distinguish the electrodes from each other; it suffices to determine which plurality of electrodes among the group of electrodes of the electrode unit 372 are to be used as a pair of the received signal electrode and the reception reference electrode. That is, in this case, of the electrodes connected to the input terminal 413 and the input terminal 414, the electrode nearer to the communication medium 280 acts as the received signal electrode as a consequence, and the electrode more distant from the communication medium 280 acts as the reception reference electrode as a consequence. Therefore the output terminal for the reception reference electrode and the output terminal for the received signal electrode do not need to be differentiated from each other. In addition, arrangement relation of the electrodes is arbitrary. Further, the magnitudes of surface areas and shapes of the electrodes are arbitrary, and may be different from each other, of course.

In addition, the receiving device 370 may specify and use a plurality of electrodes as the received signal electrode, and specify and use a plurality of electrodes as the reception reference electrode. In addition, the receiving device 370 may specify electrodes to be used as the received signal electrode and electrodes to be used as the reception reference electrode such that the electrodes to be used as the received signal electrode and the electrodes to be used as the reception reference electrode are different from each other in number.

Incidentally, one device may of course have both the functions of the above-described transmitting device 260 and the functions of the receiving device 370.

Figure 15:
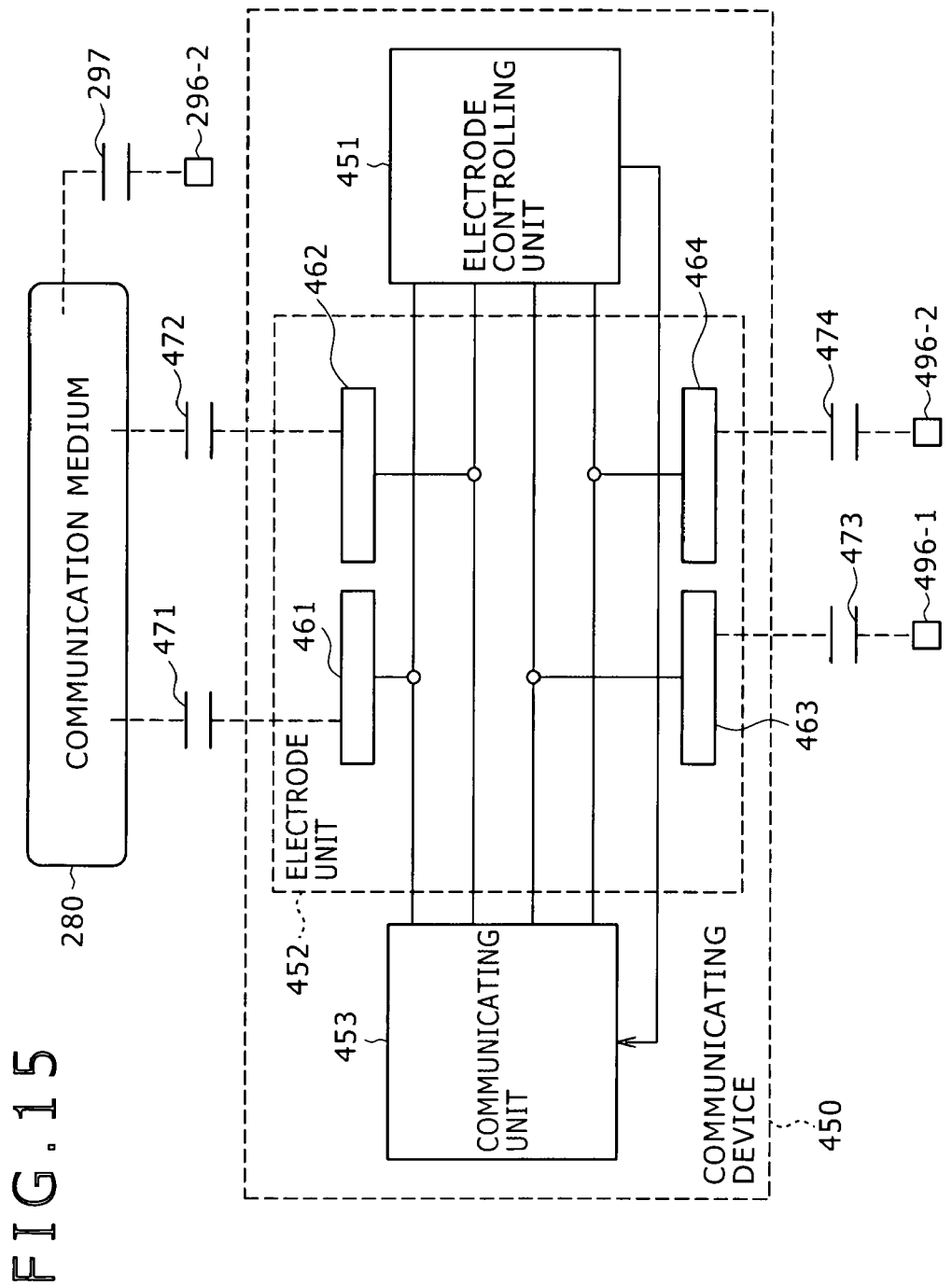
FIG. 15 is a block diagram showing an example of internal configuration of a communicating device.

FIG. 15 is a block diagram showing an example of configuration of an embodiment of a communicating device to which the present invention is applied, the communicating device corresponding to the transmitting device 260 in FIG. 7 and the receiving device 370 in FIG. 13.

The communicating device 450 in FIG. 15 performs the same communications as the communications performed by the transmitting device 260 and the receiving device 370 bidirectionally with another communicating device 450 via a communication medium 280. The communicating device 450 has an electrode controlling unit 451, an electrode unit 452, and a communicating unit 453.

The electrode controlling unit 451 is a processing unit corresponding to the electrode controlling unit 261 (FIG. 7) and the electrode controlling unit 371 (FIG. 12). The electrode controlling unit 451 controls connection between the electrode unit 452 and the communicating unit 453. Specifically, the electrode controlling unit 451 checks a state of capacitive coupling of each electrode in the electrode unit 452, identifies an electrode to be used as transmission signal electrode, an electrode to be used as received signal electrode, an electrode to be used as transmission reference electrode, and an electrode to be used as reception reference electrode, and then supplies identifying information identifying the electrodes as control information to the communicating unit 453. The electrode controlling unit 451 has basically the same configuration and operation as the electrode controlling unit 261 and the electrode controlling unit 371. The block diagram and the description of the electrode controlling unit 261 shown in FIG. 8 can be applied to the electrode controlling unit 451, and therefore description thereof will be omitted. However, since the electrode unit 452 has four electrodes, the electrode controlling unit 451 checks states of capacitive coupling of all the four electrodes. More specifically, while the connecting unit 314 in FIG. 8 has been described as a switch having two contacts on one side which switch selectively connects the terminal 322 to the terminal 323 or the terminal 324, because the number of terminals selected to be connected to the terminal 322 corresponds to the number of electrodes in the electrode unit, the connecting unit in the communicating device 450 is formed by a switch having four contacts on one side.

The electrode unit 452 corresponds to the electrode unit 262 in the transmitting device 260 shown in FIG. 7. As with the electrode unit 262, the electrode unit 452 has pairs of electrodes having the shape of a disk, for example, and capacitively coupled with an outside. However, the electrode unit 452 has four electrodes 461 to 464. The communicating unit 453 corresponds to the transmitting unit 263 in the transmitting device 260 shown in FIG. 7. The communicating unit 453 performs not only a transmission process but also a process of receiving a signal via the electrode unit 452. That is, the electrode unit 452 performs a communication process for achieving a two-way communication with another communicating device 450.

For example, suppose that as shown in FIG. 15, the communication medium 280 serving as a communication path and having conductivity or dielectric properties approaches the electrode 461 and the electrode 462. At this time, the electrode 463 is facing a free space, and forms a capacitance Ccg 473 with the free space (a capacitance between the electrode 463 and a reference point 496-1 representing a virtual point at infinity from the electrode 463). Similarly, the electrode 464 is also facing the free space, and forms a capacitance Ccg 474 with the free space (a capacitance between the electrode 464 and a reference point 496-2 representing a virtual point at infinity from the electrode 464). On the other hand, as the communication medium 280 approaches the electrode 461 and the electrode 462, capacitive coupling of the electrode 461 and the electrode 462 with the free space is weakened, and capacitive coupling of the electrode 461 and the electrode 462 with the communication medium 280 becomes dominant. When the communication medium 280 is a conductor or an object having a higher dielectric constant than air, a capacitance Cce 471 viewed from the electrode 461 and a capacitance Cce 472 viewed from the electrode 462 are larger than the capacitance Ccg 473 or Ccg 474. Hence, when some signal is supplied to the electrodes, the magnitude of a load attached to the paths is known on the basis of the magnitude of signal level of the load. In the case of the free space, the capacitance is low, and thus the signal level of the load is low. In the case of a conductor or a dielectric, the capacitance is high, and thus the signal level of the load is higher.

The capacitance as viewed from the electrode is thus changed, and thereby the signal level (magnitude of amplitude) detected when a signal is applied to the electrode is changed. Thus, by detecting the signal level, the electrode controlling unit 451 can grasp a state of the electrode (whether the communication medium 280 is in the vicinity or not). The electrode controlling unit 451 controls the connection between the communicating unit 453 and the electrode unit 452 according to the state of each electrode which state is thus grasped.

Under control of the electrode controlling unit 451, the communicating unit 453 connects each of the electrodes 461 to 464 of the electrode unit 452 as the transmission signal electrode, the transmission reference electrode, the received signal electrode, or the reception reference electrode, or does not connect each of the electrodes 461 to 464.

Incidentally, the pattern of connection of the terminals in the connecting unit 403 shown in FIG. 13 is an example of connection. In practice, the connecting unit 403 is controlled by the connection controlling unit 402 as described above to change the connection of each terminal in a plurality of connection patterns including the connection pattern shown in FIG. 13.

Figure 16:
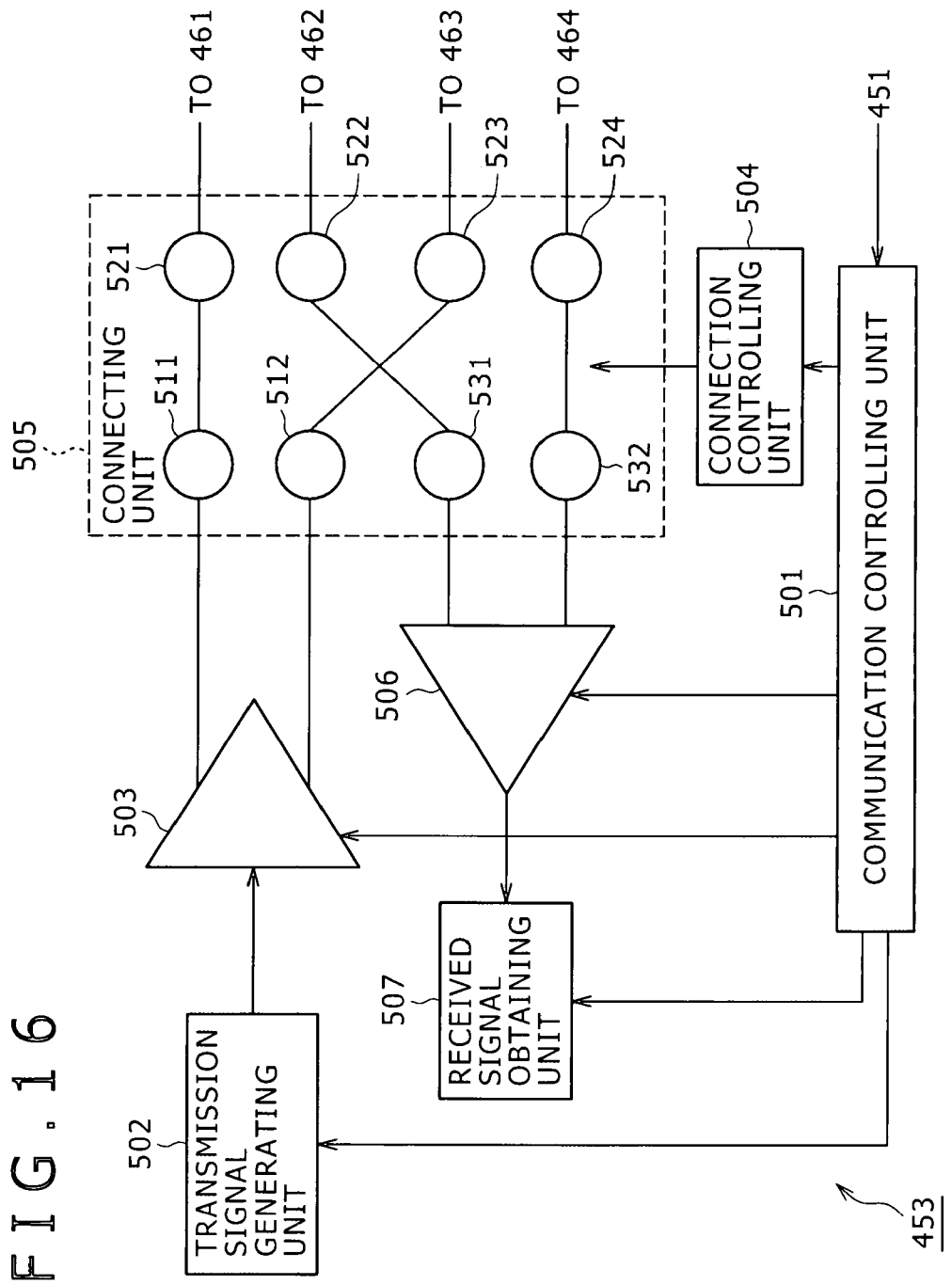
FIG. 16 is a block diagram showing an example of detailed configuration of a communicating unit in FIG. 15.

FIG. 16 is a block diagram showing an example of detailed configuration of the communicating unit 453 in FIG. 15. As shown in FIG. 16, the communicating unit 453 has a communication controlling unit 501, a transmission signal generating unit 502, an amplifying unit 503, a connection controlling unit 504, a connecting unit 505, an amplifying unit 506, and a received signal obtaining unit 507.

That is, for two-way communication, the communicating unit 453 has both a configuration corresponding to the transmitting unit 263 in FIG. 9 and a configuration corresponding to the receiving unit 373 shown in FIG. 13. Specifically, the communication controlling unit 501 corresponds to the transmission controlling unit 351 in FIG. 9 and the reception controlling unit 401 in FIG. 13. The communication controlling unit 501 performs a control process involved in a transmission process and a reception process on the basis of control information supplied from the electrode controlling unit 451. The transmission signal generating unit 502 corresponds to the transmission signal generating unit 352 in FIG. 9. The transmission signal generating unit 502 is controlled by the communication controlling unit 501 to generate a transmission signal corresponding to transmission information, and supply the transmission signal to the amplifying unit 503. The amplifying unit 503 corresponds to the amplifying unit 353 in FIG. 9. The amplifying unit 503 is controlled by the communication controlling unit 501 to amplify the transmission signal supplied from the transmission signal generating unit 502, and supply the amplified transmission signal to the connecting unit 505.

The connection controlling unit 504 corresponds to the connection controlling unit 355 in FIG. 9 and the connection controlling unit 402 in FIG. 13. The connection controlling unit 504 is controlled by the communication controlling unit 501 to control connections in the connecting unit 505. The connecting unit 505 corresponds to the connecting unit 354 in FIG. 9 and the connection controlling unit 402 in FIG. 13. The connecting unit 505 controls connections between the amplifying unit 503 and the amplifying unit 506 and the electrodes 461 to 464. The connecting unit 505 has a terminal 511 connected to a terminal of the amplifying unit 503 for the transmission signal electrode, a terminal 512 connected to a terminal of the amplifying unit 503 for the transmission reference electrode, a terminal 531 connected to a terminal of the amplifying unit 506 for the received signal electrode, and a terminal 532 connected to a terminal of the amplifying unit 506 for the reception reference electrode. The connecting unit 505 connects each of these terminals to one of a terminal 521 connected to the electrode 461, a terminal 522 connected to the electrode 462, a terminal 523 connected to the electrode 463, and a terminal 524 connected to the electrode 464 (terminals different from each other). That is, the connecting unit 505 performs a process of assigning the electrodes 461 to 464 as one of the transmission signal electrode, the transmission reference electrode, the received signal electrode, and the reception reference electrode.

The amplifying unit 506 corresponds to the amplifying unit 404 in FIG. 13. The amplifying unit 506 is controlled by the communication controlling unit 501 to amplify a received signal supplied via the connecting unit 505 and supply the received signal to the received signal obtaining unit 507. The received signal obtaining unit 507 corresponds to the received signal obtaining unit 405 in FIG. 13. The received signal obtaining unit 507 is controlled by the communication controlling unit 501 to obtain the received signal supplied from the amplifying unit 506.

Since the electrode controlling process is performed as described above, the communicating device 450 can determine for each of the electrodes whether to use the electrode as the transmission reference electrode, whether to use the electrode as the transmission signal electrode, whether to use the electrode as the reception reference electrode, whether to use the electrode as the received signal electrode, or whether to disconnect the electrode. The communicating device 450 can therefore perform signal transmission and reception stably irrespective of positional relation between the communicating device 450 and the communication medium 280.

Incidentally, there may be five or more electrodes in the electrode unit 452. In this case, the communicating device 450 can control selection of an electrode pair by switching the connecting unit 505. That is, in this case, the communicating device 450 does not need to determine an electrode to be used as the transmission signal electrode and an electrode to be used as the transmission reference electrode in such a manner as to distinguish the electrodes from each other, and does not need to determine an electrode to be used as the received signal electrode and an electrode to be used as the reception reference electrode in such a manner as to distinguish the electrodes from each other. It suffices for the communicating device 450 to determine which plurality of electrodes or which electrode among the group of electrodes of the electrode unit 452 are to be used as an electrode pair for signal transmission, and determine which plurality of electrodes or which electrode among the group of electrodes of the electrode unit 452 are to be used as an electrode pair for signal reception.

In addition, the communicating device 450 may allow an electrode to be shared between the electrode pair for signal transmission and the electrode pair for signal reception. Further, the communicating device 450 may identify a plurality of electrodes as electrodes to be used as the transmission signal electrode, identify a plurality of electrodes as electrodes to be used as the transmission reference electrode, identify a plurality of electrodes as electrodes to be used as the received signal electrode, and identify a plurality of electrodes as electrodes to be used as the reception reference electrode.

In addition, the communicating device 450 may identify electrodes to be used as the transmission signal electrode, electrodes to be used as the transmission reference electrode, electrodes to be used as the received signal electrode, and electrodes to be used as the reception reference electrode such that the electrodes to be used as the transmission signal electrode, the electrodes to be used as the transmission reference electrode, the electrodes to be used as the received signal electrode, and the electrodes to be used as the reception reference electrode are different from each other in number. In addition, arrangement relation of the electrodes is arbitrary. Further, the magnitudes of surface areas and shapes of the electrodes are arbitrary, and may be different from each other, of course.

Incidentally, the pattern of connection of the terminals in the connecting unit 505 shown in FIG. 16 is an example of connection. In practice, the connecting unit 505 is controlled by the connection controlling unit 504 as described above to change the connection of each terminal in a plurality of connection patterns including a connection pattern shown in FIG. 16.

Incidentally, the communicating device 450 performs a transmission process and a reception process in the same manner as the transmitting device 260 and the receiving device 370 described above. Hence, the communicating device 450 performs the electrode controlling process of checking a state of capacitive coupling of each electrode and assigning each electrode as one of the transmission signal electrode, the transmission reference electrode, the received signal electrode, and the reception reference electrode according to the state in the same manner as described with reference to the flowchart of FIG. 11. Therefore description thereof will be omitted.

Figure 17:
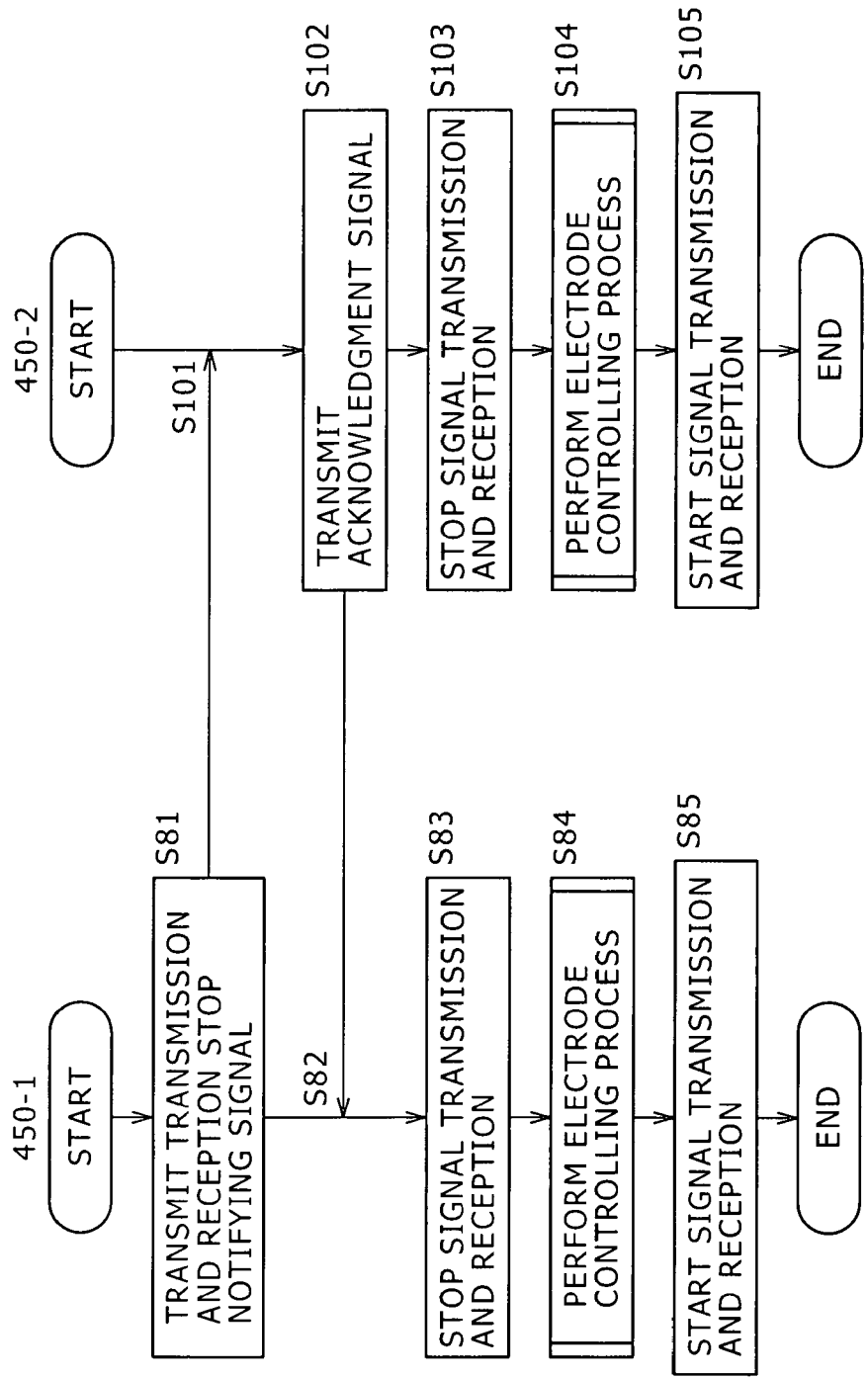
FIG. 17 is a flowchart of assistance in explaining a flow of a communication process.

Incidentally, a plurality of communicating devices 450 performing communication may synchronize timing of performing the electrode controlling process as in the case of the transmitting device 260 and the receiving device 370 described above. A flow of the process in this case will be described with reference to a flowchart of FIG. 17.

With predetermined timing or a predetermined event as a cue, one of two communicating devices 450 communicating with each other (a communicating device 450-1) transmits a transmission and reception stop notifying signal notifying a stoppage of a transmission and reception process to the other communicating device in step S81. The other communicating device 450-2 as the other device communicating with the communicating device 450-1 receives the transmission and reception stop notifying signal in step S101. The communicating device 450-2 transmits an acknowledgment signal in response to the received transmission and reception stop notifying signal in step S102.

The communicating device 450-1 receives the acknowledgment signal in step S82. Receiving the acknowledgment signal, the communicating device 450-1 stops signal transmission and reception in step S83, and performs the electrode controlling process in step S84. Details of the electrode controlling process are the same as described with reference to the flowchart of FIG. 11, and therefore description thereof will be omitted. After the electrode controlling process is ended, the communicating device 450-1 starts signal transmission and reception in step S85, and then ends the process.

The communicating device 450-2 that has transmitted the acknowledgment signal stops signal transmission and reception in step S103, and performs the electrode controlling process in step S104. Details of the electrode controlling process are the same as described with reference to the flowchart of FIG. 11, and therefore description thereof will be omitted. After the electrode controlling process is ended, the communicating device 450-2 starts signal transmission and reception in step S105, and then ends the process.

As described above, the communicating device 450-1 and the communicating device 450-2 performing communication synchronize the timing of performing the electrode controlling process with each other. Thereby, the communicating devices 450 reduce problems in communication such for example as a case where while one of the communicating devices 450 is performing the electrode controlling process, the other device transmits a signal. Therefore the communication process can be performed more efficiently and more accurately.

For the determination of the detecting unit in each device described above, a method can be considered in which method a comparison signal level is determined in advance, and determination is made on the basis of whether a signal level is higher or lower than the comparison signal level. The electrode whose level is close to the comparison signal level may be in a subtle position relation to the communication medium 30 (for example the hand 220 in FIG. 6), and therefore is not connected to any electrode by the connecting unit of the transmitting device, the receiving device, and the communicating device, whereby adverse effects on other electrodes can be avoided.

Incidentally, the timing of performing the electrode controlling process described above (that is, updating the function assigned to each electrode) may be any timing. For example, however, when the communicating device 450 is formed as a mobile device or the like, and communication is performed with a human body (user) as a communication medium, positional relation between the user (communication medium) and the communicating device 450 (electrodes) may be changed during the communication as a result of for example the user changing a manner of holding the communicating device 450. It is therefore desirable not only to perform the electrode controlling process in an initial state at a time of a start or the like but also to repeatedly perform the electrode controlling process at a predetermined frequency during communication.

Figure 18A:
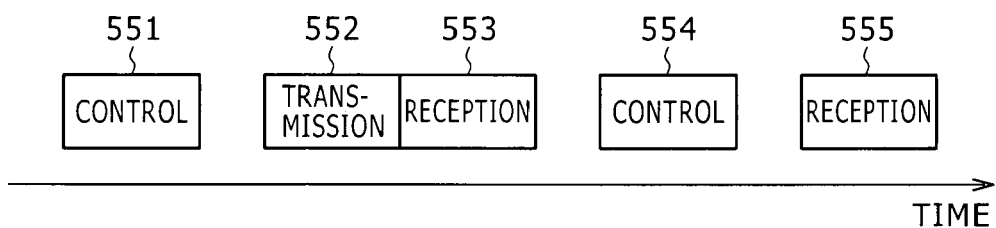
FIGS. 18A, 18B, and 18C are diagrams of assistance in explaining examples of timing of performing the electrode controlling process.

For example, as shown in FIG. 18A, the communicating device 450 may perform the electrode controlling process (control 551 or control 554) using a free time during which the transmission process (transmission 552) or the reception process (reception 553 or reception 555) is not performed (when the transmission process or the reception process is not performed for a predetermined time, for example), and thereby update the assignment of electrodes as the transmission signal electrode, the transmission reference electrode, the received signal electrode, or the reception reference electrode. Thus, the communicating device 450 can perform communication while using time effectively, and thereby improve communication efficiency.

Figure 18B:
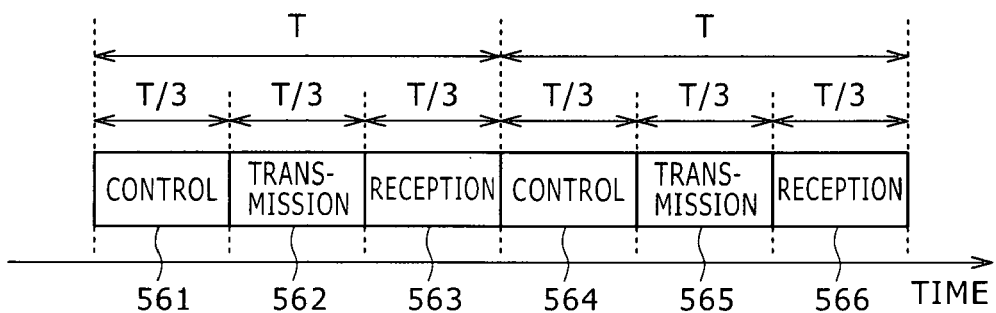

In addition, for example, as shown in FIG. 18B, the communicating device 450 may continuously perform the electrode controlling process, the transmission process, and the reception process such as control 561, transmission 562, reception 563, control 564, transmission 565, and reception 566, and repeatedly perform the processes as one cycle. For example, in the example shown in FIG. 18B, the communicating device 450 continuously performs the electrode controlling process, the transmission process, and the reception process in respective T/3 times with a periodic T time as a repetition period, and further repeatedly performs the series of processes as one cycle. Thus, timing of performing each process is fixed. Therefore the communicating device 450 can easily synchronize the timing of the performance with another communicating device 450.

Figure 18C:
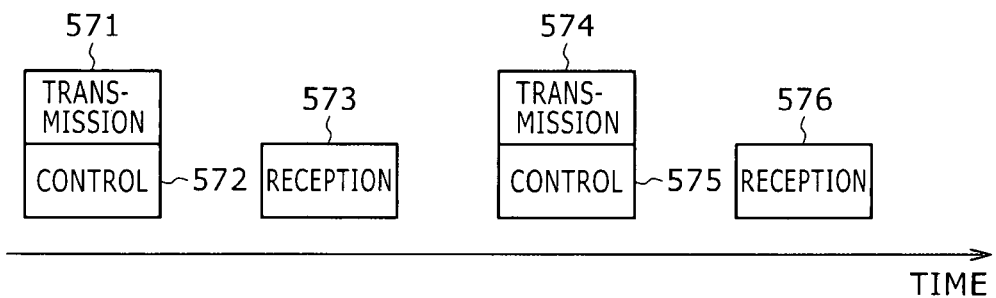

Further, as shown in FIG. 18C, for example, the communicating device 450 may perform the electrode controlling process using a transmission signal. In this case, the transmission process (transmission 571 or transmission 574) and the electrode controlling process (control 572 or control 575) are performed simultaneously. The reception process (reception 573 or reception 576) is performed in other times. In this case, the communicating device 450 measures a signal level when supplying a transmission signal to an electrode (that is, when transmitting a signal), and grasps a state of capacitive coupling of each electrode on the basis of the signal level. Thus, the communicating device 450 can simplify process steps, reduce a load, and also shorten a process performing time and thereby shorten the repetition period.

Incidentally, in the above description, the electrode controlling unit 261, the electrode controlling unit 371, and the electrode controlling unit 451 each check states of capacitive coupling of respective electrodes one by one. However, the present invention is not limited to this; for example, states of capacitive coupling of all electrodes may be checked simultaneously.

FIG. 19 is a block diagram showing an example of internal configuration of the electrode controlling unit 451 in the communicating device 450 in this case. The electrode controlling unit 451 shown in FIG. 19 has a detecting unit 613 and a connecting unit 614 different from the detecting unit and the connecting unit of the electrode controlling unit 261 shown in FIG. 8.

The detecting unit 613 has a plurality of load resistances 621 to 624 connected in series with each other between the switch 312 and a reference point 626. Terminals 631A to 634A of the connecting unit 614 are connected between the respective resistances (four points). Potentials of these connection points are each supplied to the retaining unit 303.

The resistance values of the load resistances 621 to 625 are each known. The terminals 631A to 634A of the connecting unit 614 are respectively one terminal of switches 631 to 634. When the switches 631 to 634 are brought into an on state, the terminals 631A to 634A are respectively connected to other terminals 631B to 634B. The terminals 631B to 634B are respectively connected to the electrodes 461 to 464 of the electrode unit 452.

Hence, for example, respective capacitances when the electrodes 461 to 464 are each capacitively coupled with a space surrounding the communicating device 450 (when the communication medium is not in the vicinity) are known, and thus potentials between the load resistances 621 to 624 when each switch of the connecting unit 614 is turned on are also known.

When the communication medium is placed in proximity to an electrode, on the other hand, the capacitance between the electrode and the surroundings is changed. Thus, the detecting unit 613 detects resulting changes in the potentials between the load resistances 621 to 624 (changes in signal level), and makes the retaining unit 303 retain a result of the detection. On the basis of the changes in the levels of the signals input to the respective electrodes which changes are retained in the retaining unit 303, the main control unit 301 controls the assignment of a function (the transmission signal electrode, the transmission reference electrode, the received signal electrode, or the reception reference electrode) to each electrode.

Thus, since the states of capacitive coupling of the plurality of electrodes can be checked in one process, the communicating device 450 can control the assignment of a function to each electrode more easily and more quickly. Incidentally, any number of electrodes may be checked simultaneously at this time. All the electrodes possessed by the communicating device 450 may be checked simultaneously, or a part of the electrodes possessed by the communicating device 450 may be checked simultaneously.

In addition, while in the above description, all the electrodes are checked using one detecting unit, a plurality of detecting units may be provided. For example, detecting units equal in number to that of electrodes may be provided, and the detecting units may be connected to the electrodes different from each other. In this case, the detecting units respectively detect signals input to the electrodes different from each other (each detecting unit detects a signal input to the corresponding electrode).

As described above, the communicating device 450 to which the present invention is applied not only achieves a communication environment not limited by a use environment by eliminating a need for a physical reference point path and achieving communication by only a communication signal transmitting path, but also can perform stable communication irrespective of positional relation between the communicating device 450 and the communication medium in proximity to the communicating device 450 by controlling the assignment of a function to each electrode.

Incidentally, in the above description, each device (the transmitting device, the receiving device, and the communicating device) in the communication system to which the present invention is applied transmits or receives a signal with a predetermined potential as a reference. However, the present invention is not limited to this, and for example two signals whose phases are reversed with respect to each other may be transmitted via two transmission lines, so that a differential signal transmitting information represented by difference between the signals is transmitted and received. In this case, the two transmission lines are provided as communication medium between the devices communicating with each other. Also, in this case, the transmitting unit in the transmitting device, the receiving unit in the receiving device, and the communicating unit in the communicating device are each formed by a differential circuit.

Incidentally, the series of processes described above (for example the electrode controlling process and the like) can be carried out not only by hardware but also by software. In this case, for example, the above-described main control unit 301 may be formed as a personal computer as shown in FIG. 20.

Figure 20:
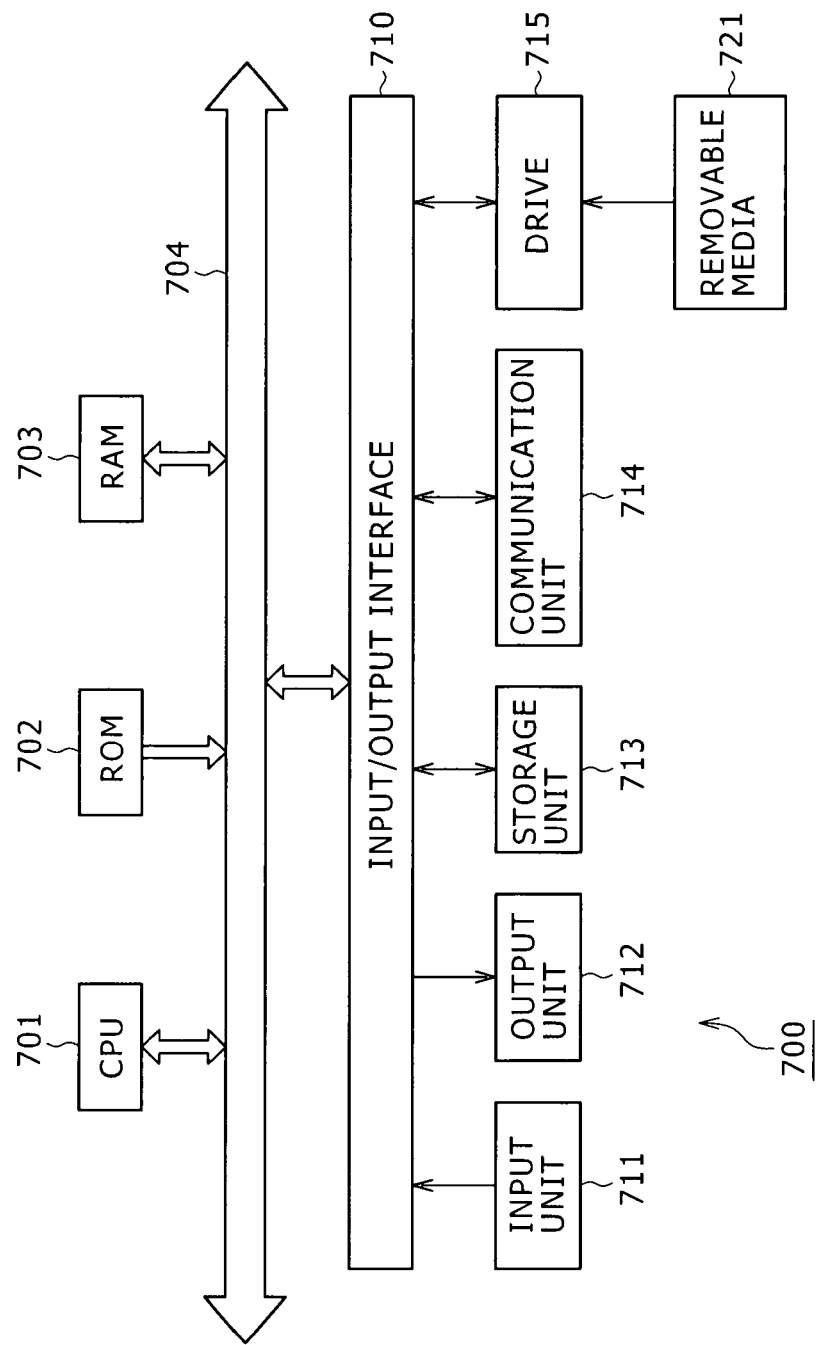
FIG. 20 is a diagram showing an example of configuration of a personal computer to which an embodiment of the present invention is applied.

In FIG. 20, a CPU 701 of the personal computer 700 performs various processes according to a program stored in a ROM 702 or a program loaded from a storage unit 713 into a RAM 703. The RAM 703 also stores data and the like necessary for the CPU 701 to perform the various processes as required.

The CPU 701, the ROM 702, and the RAM 703 are interconnected via a bus 704. The bus 704 is also connected with an input/output interface 710.

The input/output interface 710 is connected with an input unit 711 formed by a keyboard, a mouse and the like, an output unit 712 including a display formed by a CRT (Cathode Ray Tube), an LCD (Liquid Crystal Display) or the like, a speaker, and the like, the storage unit 713 formed by a hard disk or the like, and a communication unit 714 formed by a modem or the like. The communication unit 714 performs a process of communication via a network including the Internet. In addition, the output unit 712 is connected with the signal input controlling unit 302, the retaining unit 303, the connection controlling unit 304, the switching controlling unit 305 and the like. The output unit 712 outputs control information to each of the units. Further, the input unit 711 is connected with the retaining unit 303, so that information retained in the retaining unit 303 is input from the retaining unit 303. This information is supplied to the CPU 701.

The input/output interface 710 is also connected with a drive 715 as required. A removable medium 721 such as a magnetic disk, an optical disk, a magneto-optical disk, a semiconductor memory or the like is loaded into the drive 715 as required. A computer program read from the medium is installed in the storage unit 713 as required.

When the above-described series of processes is to be carried out by software, a program constituting the software is installed from a network or a recording medium.

As shown in FIG. 20, for example, the recording medium is not only formed by the removable medium 721 distributed to users to provide the program separately from the device proper and having the program recorded thereon, the removable medium 721 including a magnetic disk (including flexible disks), an optical disk (including CD-ROM (Compact Disk-Read Only Memory) and DVD (Digital Versatile Disk)), a magneto-optical disk (including MD (Mini-Disk) (registered trademark)), a semiconductor memory or the like, but also formed by the ROM 702, the hard disk included in the storage unit 713, or the like that has the program recorded thereon and which is distributed to the user in a state of being preincorporated in the device proper.

It is to be noted that in the present specification, the steps describing the program recorded on the recording medium include not only processes carried out in time series in the described order but also processes carried out in parallel or individually and not necessarily in time series.

In addition, in the present specification, a system refers to an apparatus as a whole formed by a plurality of devices. Incidentally, a constitution described above as one device may be divided and formed as a plurality of devices. Conversely, constitutions described above as a plurality of devices may be combined with each other and formed as one device. In addition, a constitution other than the above-described constitutions may be added to the constitution of each device, of course. Further, a part of the constitution of a device may be included in the constitution of another device as long as the constitution and operation of the system as a whole are the same in effect.

The invention claimed is:

1. A communicating device for performing communication via a communication medium formed by a material having a physical characteristic that allows an electric signal to be transmitted, said communicating device having a plurality of electrodes capacitively coupled with an outside, said communicating device comprising: communication means for performing communication processing means for performing communication processing;
   connecting means for connecting said communication processing means to said plurality of electrodes; and connection controlling means for controlling said connecting means to connect a first electrode of said plurality of electrodes, said first electrode being capacitively coupled with said communication medium, to a first terminal of said communication processing means, and connect a second electrode capacitively coupled with a space more strongly than said first electrode to a second terminal of said communication processing means;
   wherein said first electrode transmits a signal through the communication medium and an amplifying means amplifies the signal transmitted.

2. The communicating device as claimed in claim 1, characterized in that,
   said connection controlling means includes:
   signal level detecting means for detecting a signal level of a signal for checking a state of capacitive coupling of each of said plurality of electrodes with surroundings when said signal is supplied to each electrode; and
   controlling means for controlling connection of said plurality of electrodes to said communication processing means on a basis of said signal level detected by said signal level detecting means.

3. The communicating device as claimed in claim 2, characterized in that:
   said connection controlling means further includes electrode selecting means for selecting an electrode to which to supply said signal, and
   said signal level detecting means detects the signal level of said signal when said signal is supplied to said electrode selected by said electrode selecting means.

4. The communicating device as claimed in claim 2, characterized in that:
   said connection controlling means further includes retaining means for retaining said signal level detected by said signal level detecting means for each said electrode, and
   said controlling means controls the connection of said plurality of electrodes to said communication processing means on the basis of the signal level of each said electrode, the signal level being retained by said retaining means.

5. The communicating device as claimed in claim 2, characterized in that:
   said connection controlling means simultaneously supplies said signal to all said electrodes, and said signal level detecting means simultaneously detects said signal level corresponding to each of all the electrodes.

6. The communicating device as claimed in claim 4, characterized in that:
   said connection controlling means further includes a plurality of loads connected to each of said plurality of electrodes and connected in series with each other, and
   said signal level detecting means detects signal levels occurring at said plurality of loads connected in series with each other.

7. The communicating device as claimed in claim 1, characterized in that: said connection controlling means controls said connecting means after stopping said communication processing by said communication processing means.

8. The communicating device as claimed in claim 1, characterized in that:
   said connection controlling means controls said connecting means in a free time of said communication processing by said communication processing means.

9. The communicating device as claimed in claim 1, characterized in that:
   said connection controlling means controls said connecting means in a manner continuous with said communication processing by said communication processing means.

10. The communicating device as claimed in claim 1, characterized in that:
    said connection controlling means controls said connecting means simultaneously with a transmission process by said communication processing means, using a transmission signal in said transmission process.

11. The communicating device as claimed in claim 1, characterized in that:
    said communication processing means has a transmitting output terminal and a receiving input terminal, and
    said connection controlling means controls said connecting means to connect said first electrode to said transmitting output terminal or said receiving input terminal of said communication processing means.

12. A communicating method of a communicating device for performing communication via a communication medium formed by a material having a physical characteristic that allows an electric signal to be transmitted, said communicating device having a plurality of electrodes capacitively coupled with an outside, said communicating method comprising:
    a communication controlling step of controlling a communication processing unit for performing communication processing; and
    a connection controlling step of controlling a connecting unit for connecting said communication processing unit for performing said communication processing under control of said communication controlling step to said plurality of electrodes to connect a first electrode of said plurality of electrodes, said first electrode being capacitively coupled with said communication medium, to a first terminal of said communication processing unit, and connect a second electrode capacitively coupled with a space more strongly than said first electrode to a second terminal of said communication processing unit and an amplifying step of amplifying the signal to be transmitted.

13. A program for making a computer perform a process of a communicating device for performing communication via a communication medium formed by a material having a physical characteristic that allows an electric signal to be transmitted, said communicating device having a plurality of electrodes capacitively coupled with an outside, said program comprising:

a communication controlling step of controlling a communication processing unit for performing communication processing; and a connection controlling step of controlling a connecting unit for connecting said communication processing unit for performing said communication processing under control of said communication controlling step to said plurality of electrodes to connect a first electrode of said plurality of electrodes, said first electrode being capacitively coupled with said communication medium, to a first terminal of said communication processing unit, and connect a second electrode capacitively coupled with a space more strongly than said first electrode to a second terminal of said communication processing unit;

and an amplifying step that amplifies the signal to be transmitted.

* * * * *